United States Patent
Galstian et al.

(10) Patent No.: US 10,747,084 B2
(45) Date of Patent: Aug. 18, 2020

(54) LIQUID CRYSTAL BEAM CONTROL DEVICE WITH IMPROVED ZONE TRANSITION AND METHOD OF MANUFACTURE THEREOF

(71) Applicant: LENSVECTOR INC., San Jose, CA (US)

(72) Inventors: Tigran Galstian, Quebec (CA); Karen Asatryan, Quebec (CA); Armen Zohrabyan, Quebec (CA); Marco Thiboutot, Quebec (CA); Vladimir Presniakov, Quebec (CA)

(73) Assignee: LENSVECTOR INC., San Jose, CA (US)

( * ) Notice: Subject to any disclaimer, the term of this patent is extended or adjusted under 35 U.S.C. 154(b) by 0 days.

(21) Appl. No.: 16/441,231

(22) Filed: Jun. 14, 2019

(65) Prior Publication Data

US 2019/0294020 A1 Sep. 26, 2019

Related U.S. Application Data

(63) Continuation of application No. 15/528,537, filed as application No. PCT/CA2015/051222 on Nov. 24, 2015, now Pat. No. 10,359,686.

(Continued)

(51) Int. Cl.
*G02F 1/1343* (2006.01)
*G02F 1/1337* (2006.01)
(Continued)

(52) U.S. Cl.
CPC ............... *G02F 1/292* (2013.01); *G02B 3/08* (2013.01); *G02F 1/1337* (2013.01);
(Continued)

(58) Field of Classification Search
CPC .. G02B 3/08; G02B 27/0172; G02B 27/0101; G02B 30/36; G02B 2027/0134;
(Continued)

(56) References Cited

U.S. PATENT DOCUMENTS

| 8,033,054 B2 | 10/2011 | Galstian et al. |
| 8,994,915 B2 | 3/2015 | Zohrabyan et al. |

(Continued)

FOREIGN PATENT DOCUMENTS

| CN | 102540588 A | 7/2012 | ........... G02F 1/1343 |
| CN | 103323985 A | 9/2013 | ........... G02F 1/1343 |

(Continued)

OTHER PUBLICATIONS

Chinese application No. 201580073812.1 search report with English translation dated Sep. 9, 2019.

(Continued)

*Primary Examiner* — Thoi V Duong

(74) *Attorney, Agent, or Firm* — J-TEK Law PLLC; Jeffrey D. Tekanic; Scott T. Wakeman

(57) ABSTRACT

A liquid crystal optical device is described configured to provide variable beam steering or refractive Fresnel lens control over light passing through an aperture of the device. The device includes at least one layer of liquid crystal material contained by substrates having alignment layers. An arrangement of electrodes is configured to provide a spatially varying electric field distribution within a number of zones within the liquid crystal layer. The liquid crystal optical device is structured to provide a spatial variation in (Continued)

optical phase delay with a transition at a boundary between zones which is an approximation of a sawtooth waveform across the boundaries of multiple zones. The arrangement of electrodes, device layered geometry and methods of driving the electrodes increase the effective aperture of the overall optical device.

13 Claims, 26 Drawing Sheets

Related U.S. Application Data

(60) Provisional application No. 62/083,665, filed on Nov. 24, 2014, provisional application No. 62/216,951, filed on Sep. 10, 2015.

(51) Int. Cl.
  *G02F 1/1339* (2006.01)
  *G02F 1/29* (2006.01)
  *G02B 3/08* (2006.01)

(52) U.S. Cl.
  CPC .... *G02F 1/13394* (2013.01); *G02F 1/133707* (2013.01); *G02F 1/134309* (2013.01); *G02F 1/29* (2013.01); *G02F 2001/134381* (2013.01); *G02F 2001/294* (2013.01)

(58) Field of Classification Search
  CPC . G06T 2207/10148; G02F 1/29; G02F 1/292; G02F 1/1337; G02F 1/133707; G02F 1/134309; G02F 1/134363; G02F 1/13306; G02F 1/133526; G02F 1/1343; G02F 1/1347; G02F 1/1345; G02F 2001/294; G02F 2001/134381; G02F 2203/24; G02F 2201/121; G02F 2201/122; G02F 2201/12; G02F 1/13394; G02F 1/133753; G02F 2001/13398
  See application file for complete search history.

(56) References Cited

U.S. PATENT DOCUMENTS

| 9,201,285 | B2 | 12/2015 | Galstian |
| 2010/0245743 | A1 | 9/2010 | Yokoyama |
| 2011/0096252 | A1 | 4/2011 | Im .................... G02F 1/1335 |
| 2011/0199548 | A1 | 8/2011 | Takama |
| 2012/0188490 | A1 | 7/2012 | Zohrabyan et al. |
| 2012/0293503 | A1 | 11/2012 | Miyazawa et al. |
| 2013/0063691 | A1* | 3/2013 | Takama .............. G02F 1/13394 |
| | | | 349/143 |
| 2013/0250223 | A1 | 9/2013 | Takagi et al. |
| 2014/0036183 | A1 | 2/2014 | Asatryan et al. |
| 2015/0219970 | A1 | 8/2015 | Liu et al. |
| 2015/0227007 | A1 | 8/2015 | Takagi et al. |
| 2016/0041449 | A1 | 2/2016 | Clark et al. |

FOREIGN PATENT DOCUMENTS

| CN | 103901680 A | 7/2014 | .......... G02F 1/1343 |
| EP | 2682810 A1 | 1/2014 | .......... G02F 1/1343 |
| WO | 2009146530 A1 | 12/2009 | |
| WO | 2012079178 A1 | 6/2012 | |
| WO | 2014071530 A1 | 5/2014 | |
| WO | 2014094165 A1 | 6/2014 | |
| WO | 2014138974 A1 | 9/2014 | |
| WO | 2014176695 A1 | 11/2014 | |

OTHER PUBLICATIONS

Chinese application No. 201580073812.1 Office Action with English translation dated Sep. 9, 2019.
Office Action from the United States Patent Office dated Feb. 13, 2020 in related U.S. Appl. No. 16/195,104.
EP 15863807 search written opinion dated Jun. 6, 2018.
EP 15863807 supplementary search report dated Jun. 6, 2018,with related claims.
International Search Report and Written Opinion of the International Searching Authority in PCT/CA2015/051222.
PCT/CA2017/050620 IPRP dated Nov. 20, 2018.
PCT/CA2017/050620 ISR dated Sep. 15, 2017,with related claims.
PCT/CA2017/050620 Search strategy.

* cited by examiner

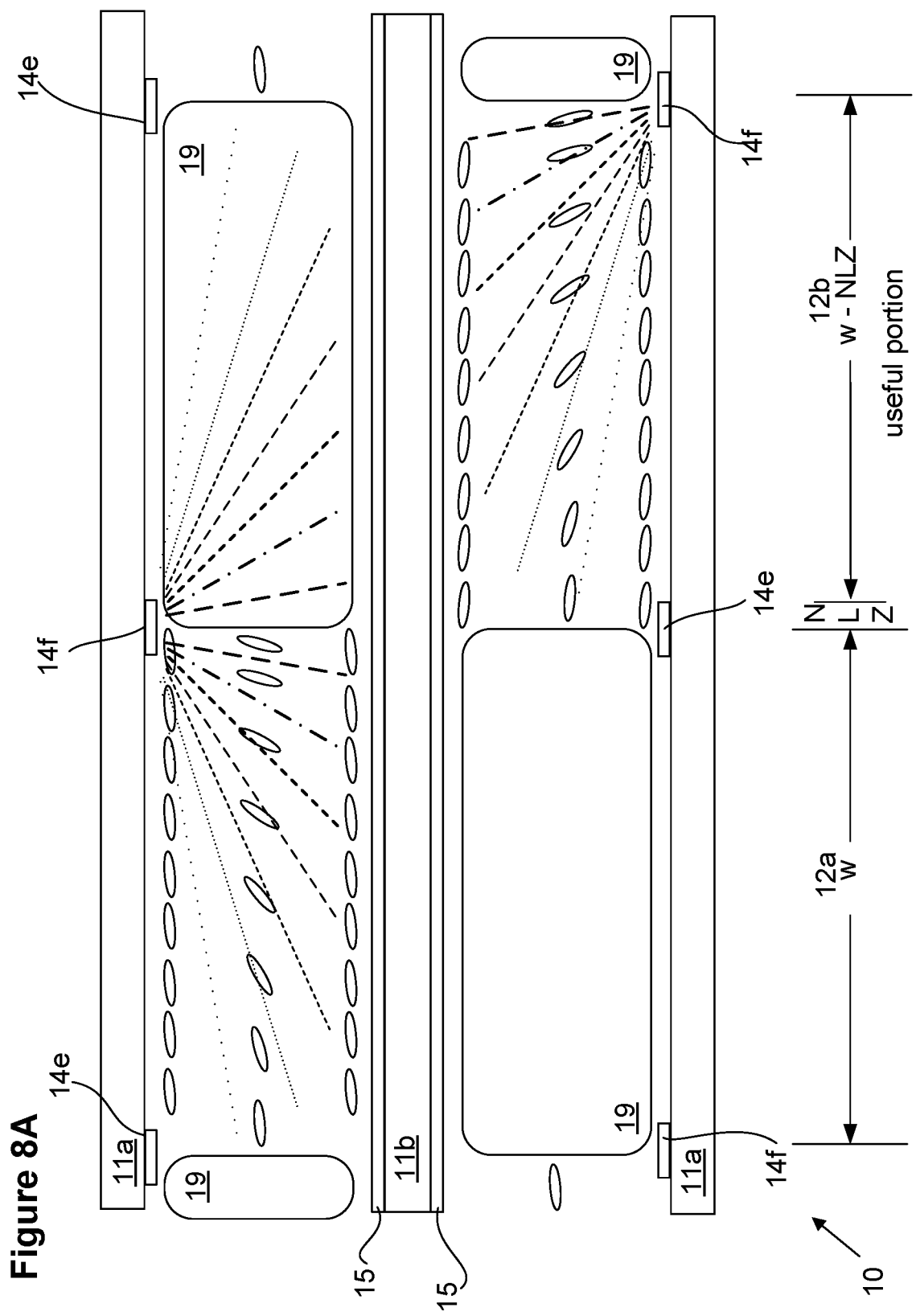

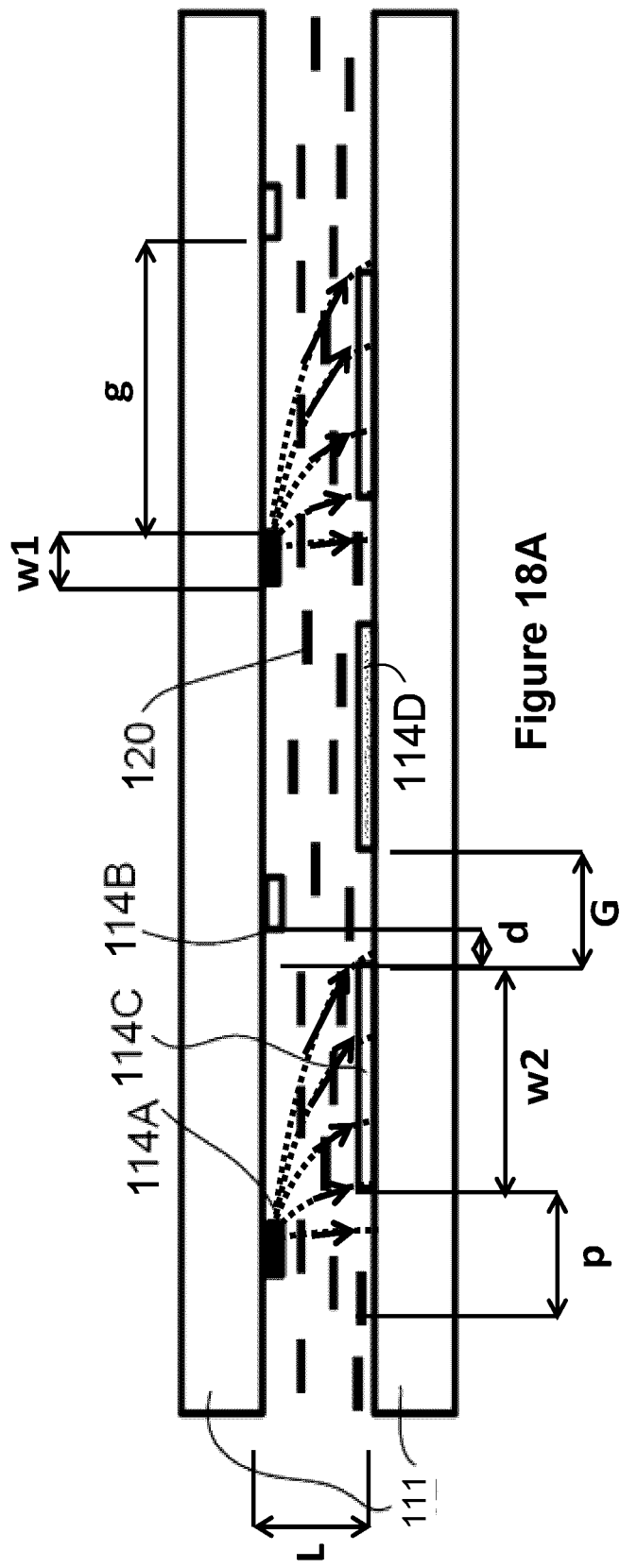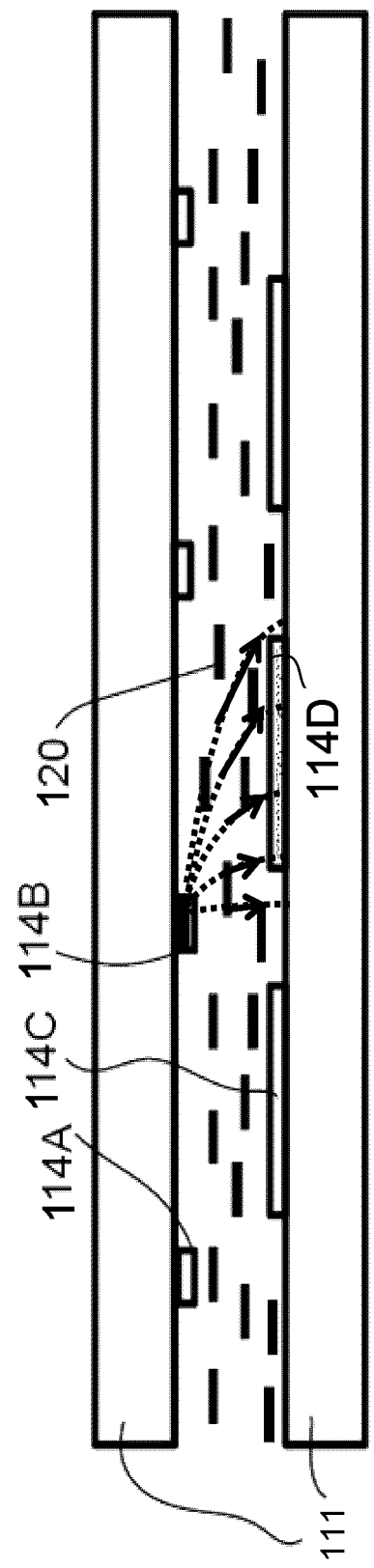

LIQUID CRYSTAL BEAM CONTROL DEVICE WITH IMPROVED ZONE TRANSITION AND METHOD OF MANUFACTURE THEREOF

RELATED APPLICATIONS

This application is an internationally filed non-provisional application of, and claims priority from, U.S. Provisional Patent Application 62/083,665 filed Nov. 24, 2014 and U.S. Provisional Patent Application 62/216,951 filed Sep. 10, 2015, the entireties of which are incorporated herein by reference.

TECHNICAL FIELD

This disclosure relates to liquid crystal optical devices, such as lenses and beam steering devices, which have neighboring segments or zones, and their manufacturing.

BACKGROUND

It has been proposed to make beam steering devices and Fresnel lenses using nematic liquid crystal cells that are dynamically controlled by a control electric field and have separated element zones. These devices have spatial variations in the index of refraction due to the spatial variations in liquid crystal molecular orientation. This creates a spatial variation in the optical phase delay that can provide beam steering devices and Fresnel lenses. Liquid crystal beam control devices are known in the art.

Such devices typically use patterned electrodes over a liquid crystal cell to create a spatial variation in the index of refraction that is useful to control a beam. To keep voltages low, electrodes can be placed on the cell substrates on the inner side or sides. To increase optical performance, the size or aspect ratio of beam shaping elements defined by the patterned electrodes can be small. To provide a device with a large aperture, many beam steering elements are arranged together, much like a Fresnel lens or beam steering device. With liquid crystal beam steering devices, the boundaries between adjacent beam steering elements can take up a large portion of the aperture, for example up to 50%, because the liquid crystal orientation changes by almost 90 degrees from one side of the boundaries to the other.

Unlike physical (fixed) Fresnel lenses or beam steering devices where there can be an abrupt change in the refractive properties at the boundary between different sections (herein referred to as "micro elements" with the understanding that the sections or micro elements are not necessary limited to very small dimensions), in the case of an electric field control over the orientation of liquid crystal molecules, it is difficult to have an electric field that can cause an abrupt change in the orientation of the liquid crystal molecules. This results in a substantial portion of the aperture of the optical device not being able to contribute to the desired optical operation of the device. This portion can be termed a "fly-back" portion or a non-linear zone (NLZ).

Various problems also exist, including the extent of the angular control, the quality of the beam intensity distribution, cost of manufacture, voltage of operation, etc. When the boundaries between the neighboring micro elements are not properly controlled, the useful portion of the optical device is reduced by boundary areas of improperly controlled liquid crystal.

SUMMARY

Applicant has discovered a number of characteristics related to the optical performance of beam steering liquid crystal devices.

Applicant proposes a liquid crystal optical device that provides a spatial variation in the optical phase delay with an abrupt transition at a boundary between micro elements that is not possible with conventional liquid crystal optical device electric control field electrode systems. This phase delay profile can be an approximation of a sawtooth waveform across the boundaries of multiple micro elements. The phase delay profile need not be a sawtooth waveform over the aperture, however, a spatially compressed or abrupt change in phase delay at the boundary region, similar to that of a sawtooth waveform, is desirable. Applicant also proposes a liquid crystal optical device that improves the electric field control of liquid crystal at the boundary between micro elements. This reduces improperly steered (redirected) or focussed light, and it also increases the effective aperture of the optical device.

The improved phase delay transition at the boundary between micro elements can be achieved using a combination of low and high frequency electric fields with a dual frequency liquid crystal.

The improved phase delay transition at the boundary between micro elements can be achieved using floating electrodes that help to shape the electric field within the micro elements.

The improved phase delay transition at the boundary between lens and/or steering elements can be achieved using a pair of liquid crystal layers each having micro elements separated by optically inert zones that correspond to optically inert zones and micro elements of the other layer, so that the electric field acting on the liquid crystal of the micro elements does not act on the inert zones.

The improved phase delay transition at the boundary between lens elements can be achieved using a conductive wall arranged between liquid crystal micro elements, so that the electric field acting on the liquid crystal of one micro element does not act on the liquid crystal of neighboring micro elements.

The improved phase delay transition at the boundary between lens and/or steering elements can be achieved using a difference in the phase of electrical signals supplied to the electrodes of the liquid crystal micro elements, so that the electric field acting on the liquid crystal of one micro element is directed in part in a direction of the liquid crystal layer direction, with the result also that the electric fields generated by electrodes from neighboring micro elements have a minimal influence of the phase delay profile. Differences in voltage of the micro element electrodes can also be used to achieve the desired electric field and liquid crystal control interaction.

Applicant has discovered that an electric field profile suitable for beam steering, namely type of sawtooth profile, can be achieved using an offset between a strip electrode on one side of the liquid crystal cell and a wider middle electrode on an opposed side of the liquid crystal cell. The result of this electrode geometry is to provide an intense electric field in the liquid crystal cell near the strip electrode and a gradually decreasing electric field in the liquid crystal cell extending across the middle electrode. The offset provides an electric field formation with field lines extending from the strip electrode essentially perpendicularly through the cell to wrap around the opposite side of the middle electrode. The lines of electric field are quite perpendicular through the liquid crystal for an electrode arrangement that does not use a weakly conductive layer or a great distance between the opposed electrodes.

This electrode arrangement provides a beam steering liquid crystal profile when there is no effective electrode on the opposed side of the liquid crystal cell to the side of the strip electrode opposite where the wider middle electrode is located. To provide beam steering over the whole aperture, two layers of liquid crystal can be arranged to have the spaced apart beam steering liquid crystal elements of one layer aligned with the idle or non-beam steering liquid crystal elements of the other layer.

The direction of steering can be changed by using additional middle electrodes (so that the beam steering liquid crystal orientation profile form in the other direction) or by using additional strip electrodes provided on the other side of the middle opposed electrodes.

Applicant has also discovered that such an offset electrode structure can provide a good effective aperture for a beam steering device having a single layer by using time multiplexed control of the electrodes. Thus when electrodes of odd elements are powered, the electrodes of even elements can be disconnected to be electrically floating, and when the electrodes of even elements are powered, the electrodes of the odd elements can be disconnected to be electrically floating.

Applicant has also discovered that the optical performance of the device can be dependent on the direction of light travel through the device, for example from top to bottom versus from bottom to top, when the electric field is different between near one substrate and near the other substrate of the liquid crystal cell. The difference due to the direction of travel through the device can be very significant for certain geometries or designs of devices.

Applicant has also discovered that different direction (e.g. orthogonal) patterned electrode arrays can be arranged with separation by a thin insulating layer on a common substrate and provide dual direction beam control using a single layer of liquid crystal (for the polarization controlled by the layer). Such a device can provide beam control independently in each of the directions.

BRIEF DESCRIPTION OF THE DRAWINGS

The invention will be better understood by way of the following detailed description of proposed embodiments with reference to the appended drawings, in which:

FIG. 8A is a schematic cross-sectional diagram across neighboring zones or beam steering elements of a LC beam steering device, in which control of the electric field is provided by one control electrode per zone employing wide optically transparent walls extending in every other element zone, in accordance with the proposed solution;

FIG. 18A is a schematic cross-section illustration of a single liquid crystal cell beam steering device that can be operated in a time multiplexed manner to provide a beam steering optical phase delay profile in each element of the device (namely both odd and even), shown in the state of actuation of odd elements, in accordance with an embodiment of the proposed solution;

FIG. 18B is the same illustration as FIG. 18A, shown in the state of actuation of even element, in accordance with an embodiment of the proposed solution;

DETAILED DESCRIPTION

Cross-Plane Field Control

Figure 1:
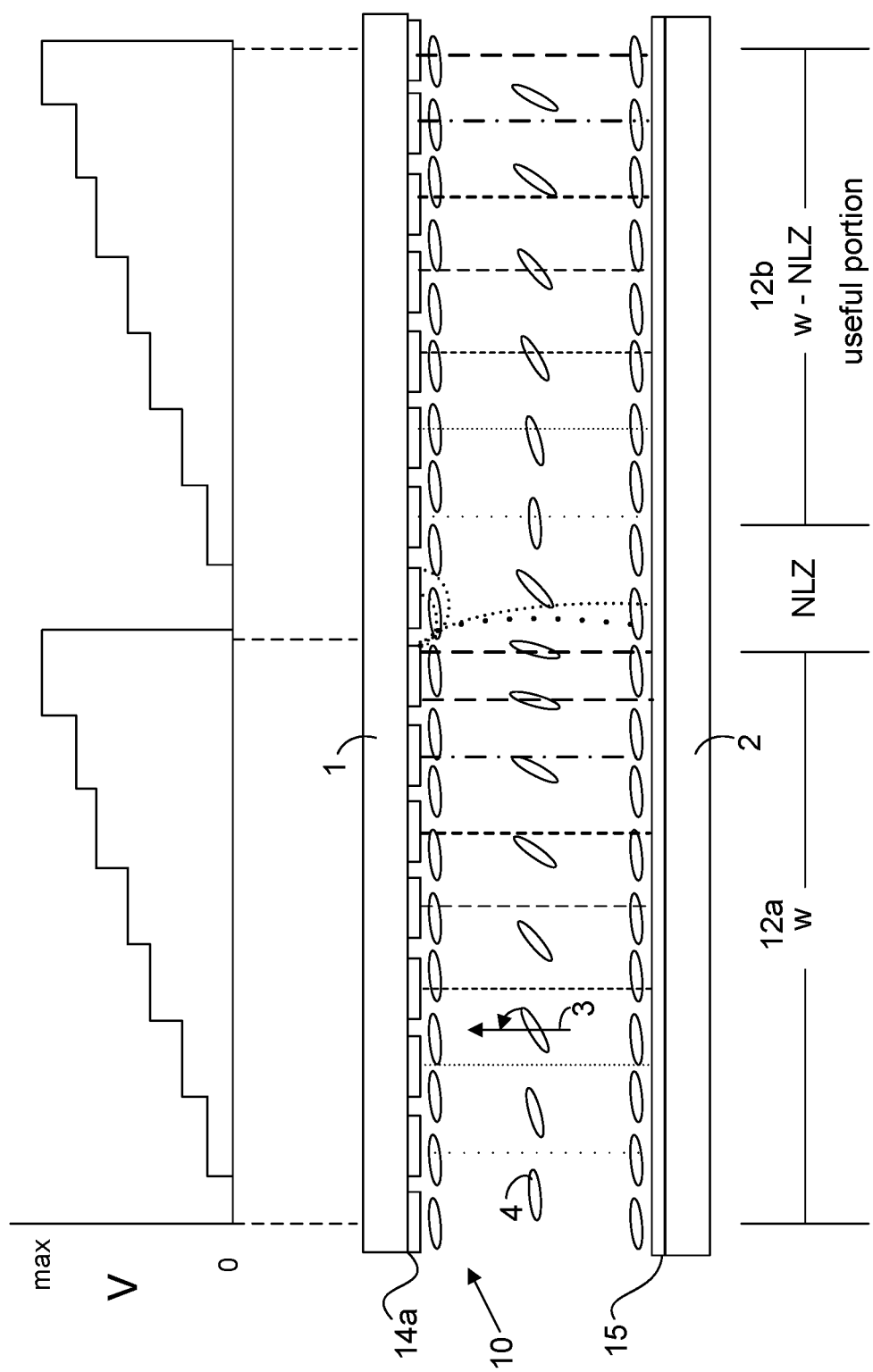
FIG. 1 is a schematic sectional diagram of a portion of a prior art liquid crystal beam steering device having two zones or beam steering micro elements, in which control of the electric field is achieved by a large number of electrodes to provide a spatially variable electric field.
Figure 6:
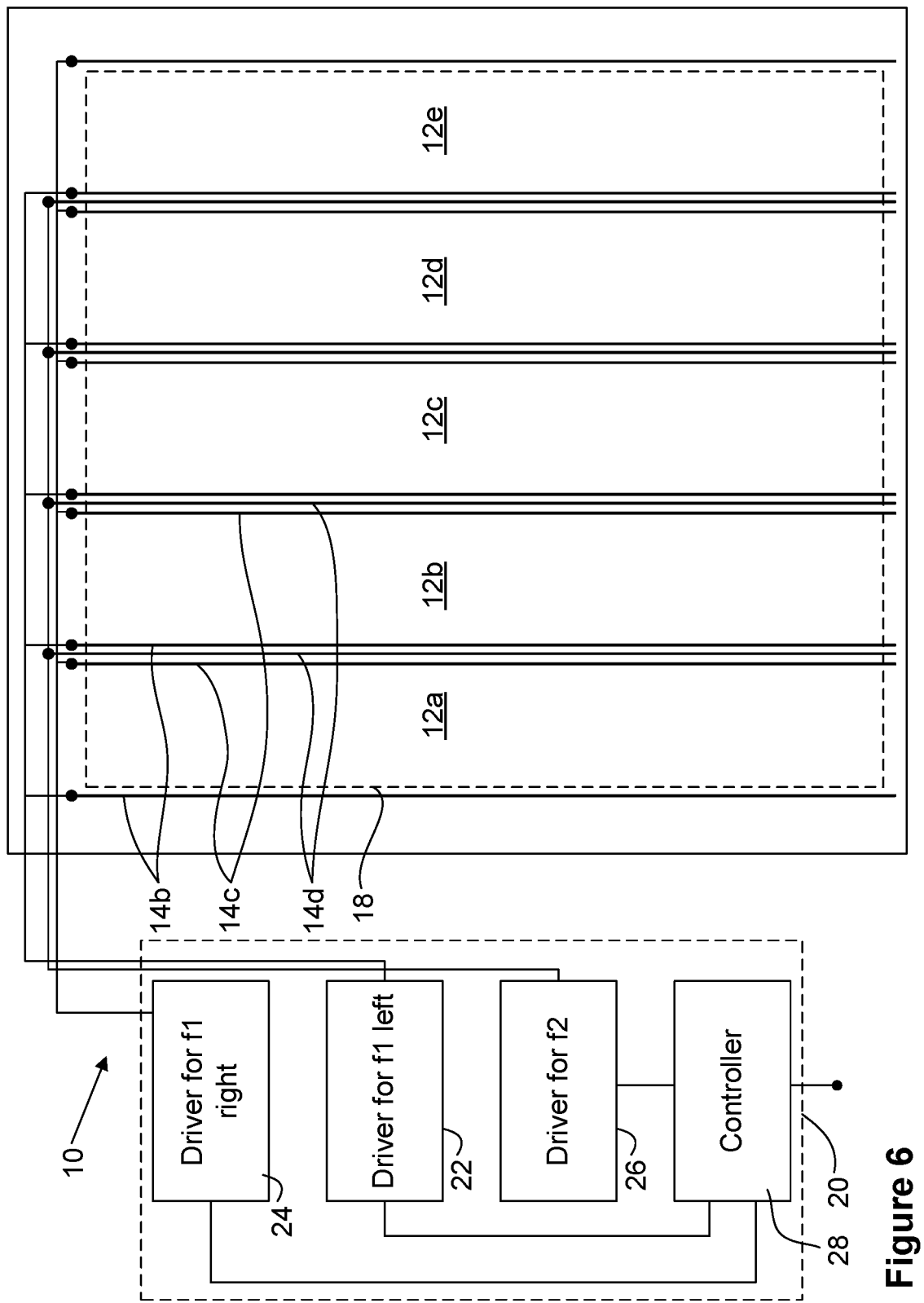
FIG. 6 is a schematic diagram of the device of FIG. 5 shown in plan view with five zones and connected to a driver circuit.

FIG. 1 illustrates a beam steering liquid crystal device 10 having two zones or segments 12a and 12b. The liquid crystal material is contained by substrates providing the aperture and being sealed at their edges (not shown). The electric field is provided by narrow electrodes 14a (for example arranged as strips, as shown in FIG. 6) that are each supplied with a desired voltage and are opposite a planar electrode 15. In the embodiment shown, the electrodes are provided on the substrates inside the cell. This can reduce the required voltages, while it is possible to arrange electrode on the outside of the cell, for example on the opposite sides of the relatively thin substrates.

As is known in the art, electrodes for a transmissive liquid crystal device can be transparent, for example of a coating of indium tin oxide (ITO) material. The approximate voltage as shown (in the inset at the top of the figure) ramps up at one side of zone 12a from zero or a minimum value and begins again the same ramp on the other side of the zone boundary in zone 12b. The drive frequency can be the same for all of the electrodes 14a, and the liquid crystal molecules 4 orient themselves to be parallel to the electric field 3. While the drive signal for a liquid crystal cell is typically an AC signal, in some circumstances, it will be appreciated that low voltage DC signals can also be applied.

An alignment layer on the cell walls (not shown) keeps the ground-state nematic liquid crystal molecules aligned in one direction as illustrated. Such alignment layers (such as rubbed polyimide) are well known in the art.

The width of the zones 12 is 'w', the beam steering angle θ of the zone is increased by the value of the change in index of refraction δn of the liquid crystal material on opposite extremes of the zone 12 and the thickness of the cell L, however it is reduced as the width 'w' increases, namely $$\theta \approx \frac{\delta n \cdot L}{w}.$$

Therefore, it is desirable to reduce w.

Electric field lines extend from areas of voltage differentials, and the intensity of the electric field drops with the distance between those areas. The electric field lines (corresponding to the above described ramps) are schematically illustrated in FIG. 1 in dashed lines of different weight corresponding to different field strength. When the voltage applied to the electrode segments 14a is equal and the planar electrode 15 is at a common or ground voltage, then the electric field in the cell is essentially uniform (no voltage ramps) with electric field lines being essentially perpendicular to the cell wall substrates (not shown). The field strength is proportional to the voltage divided by the distance between electrodes 14a and 15, or the cell gap size.

When the voltage is ramped using small segments 14a, the electric field intensity will be varying spatially across the aperture (for example as schematically illustrated). An electric field that is spatially varying, however with parallel lines all being perpendicular to the substrates over the whole aperture is desirable for control of the liquid crystal.

If some of the segments 14a were not connected to a potential, the electric field lines opposite those disconnected segments 14a would be curved and would reduce in intensity with the distance away from the other powered electrode segments 14a. Such curved electric field lines are also known as the fringing electric field.

The zero or minimum voltage electrode segment 14a of zone 12b has a fringing electric field created by the neighboring maximum voltage electrode segment 14a of zone 12a by creating some field lines between the two electrodes 14a at the zone boundary (there is still an electric field created by the maximum voltage electrode segment 14a of zone 12a within the cell opposite the zero or minimum voltage electrode segment 14a of zone 12b). This is schematically illustrated by the arcuate dotted lines between electrode segments between zone 12a and 12b in the central part of FIG. 1. Thus, the desired zero or minimum electric field in zone 12b is not achieved. Furthermore, electric field lines are not parallel within the cell opposite the zero or minimum voltage electrode segment 14a of zone 12b, thus leading to undesired orientation of the liquid crystal molecules between zones 12a and 12b.

In the transition area between the zones 12a and 12b, a non-linear orientation zone (NLZ) is thus created where the electric field changes from being defined by Vmax down to a field defined by zero or Vmin. An abrupt change in the electric field is not possible using such electrodes alone. The NLZ can also be called a reset zone or a "fly-back region".

The result is that the effective working portion of the device (with linear ramp) is reduced to the fraction (w-NLZ)/w when many zones 12 are provided across the aperture of such a device. The NLZ deviates the light in undesired directions (compared to the linear ramp area that re-directs light in the desired direction) and is thus not desirable.

Figure 2:
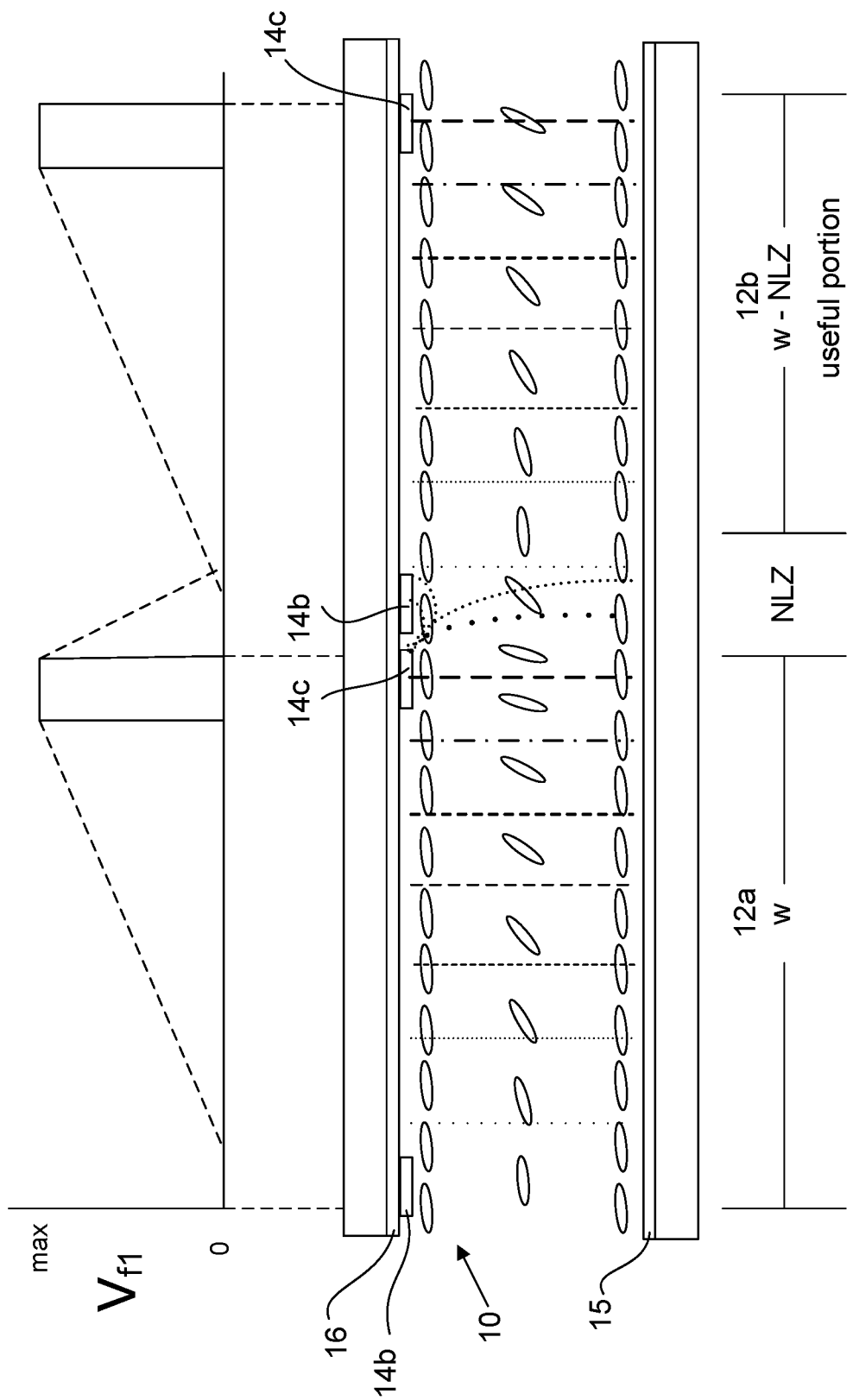
FIG. 2 is a schematic sectional diagram of a portion of a prior art liquid crystal beam steering device having two zones or beam steering micro elements, in which control of the electric field is achieved by two electrodes per zone and a layer of a highly resistive material to help extend the electric field across each zone.

In FIG. 2, the series of electrode segments 14a is simplified by using a weakly conductive (or highly resistive) layer 16 and a pair of boundary electrodes 14b and 14c. The weakly conductive layer helps to gradually spread the voltage across the aperture of each zone 12a and 12b without requiring a series of individually controlled electrodes 14a, as schematically illustrated using dashed lines in FIG. 2. The spreading out of the voltage can be controlled using the frequency of the voltage applied to electrodes 14c to shape the voltage distribution, however this frequency still causes parallel alignment of the liquid crystal molecules with the electric field (when the dielectric anisotropy of the LC is positive). Electrodes 14b can be grounded or connected to a lower voltage level as desired. In the arrangement of FIG. 2, the number of electrodes per zone is reduced from the many of FIG. 1 to only two. It is possible to include one or a small number of additional electrodes to help shape the voltage distribution over the aperture, in particular near the edges.

The electric field created using such a hole-patterned electrode arrangement with a weakly conductive layer has lines essentially parallel to each other and perpendicular to the substrates over the aperture of the device, and thus is suitable for controlling the liquid crystal. The expression "hole-patterned electrode" is used to mean when an electrode structure uses the absence of electrode to create a spatial variation in the resulting electric field, whether the hole is a gap between two independent electrodes, a gap extending beyond an electrode, or an aperture in a single electrode.

It will be understood that the NLZ here (in FIG. 2) is essentially still a problem as in FIG. 1 while the control electrode complexity has been reduced i.e. fewer electrodes 14 need to be driven per zone 12.

Figure 3:
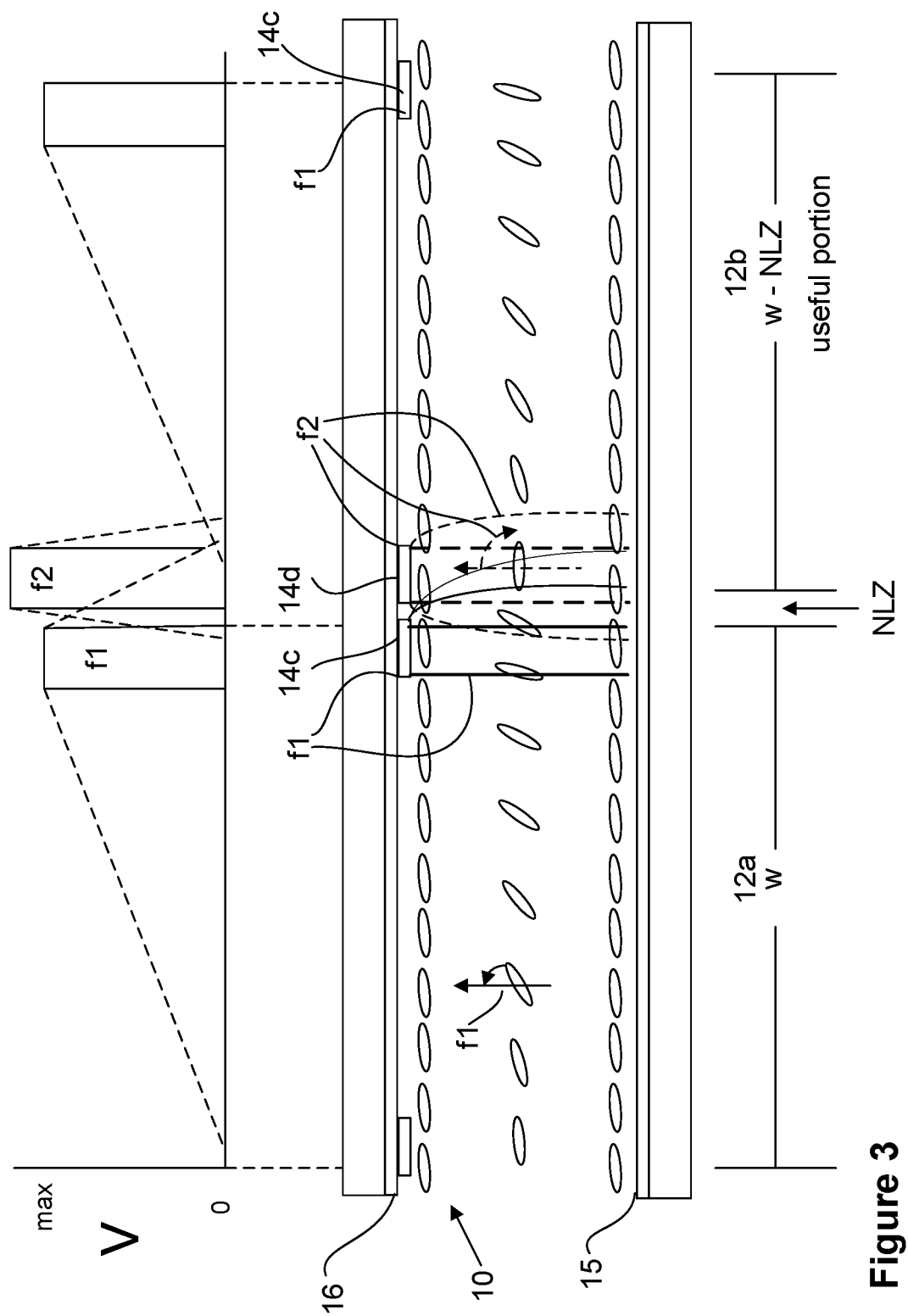
FIG. 3 is a schematic sectional diagram of a dual frequency liquid crystal (DFLC) beam steering device having two zones or beam steering elements, in which control of the electric field is achieved by two electrodes per zone and a layer of a highly resistive material to control the extent of the electric field across each zone, in which an electrode is supplied a high frequency electrical signal causing local alignment of the liquid crystal perpendicularly to an non-local alignment of liquid crystal with the electric field at lower frequencies.

In FIG. 3, electrode 14d is provided and connected to a high frequency (illustrated as f2) voltage that acts on the liquid crystal to cause orientation perpendicularly to the electric field. The liquid crystal is a Dual Frequency Liquid Crystal (DFLC), as is known in the art. With electrode 14c connected to a relatively low frequency (illustrated as f1) the electrode arrangement causes orientation of the liquid crystal molecules parallel to the electric field, the liquid crystal within the cell is oriented by electrode 14c to be nearly orthogonal to the alignment layers, while the higher frequency provided to electrode 14d helps to force the liquid crystal molecules within the cell to be perpendicular to the electric field, and thus to stay parallel to the alignment layers. Because the frequency of the voltage applied to the electrodes 14d is high, the weakly conductive layer does not help to spread out the high frequency electric field as much as for the lower frequency applied to the electrodes 14c. The opposite situation may also be considered if the ground state alignment of the LC is different, for example, perpendicular to the alignment layers.

The electric field lines schematically illustrated in FIG. 3 as solid for f1 and dashed for f2. The two fields overlap and their effect is still felt on the liquid crystal material. Electrode 14c generates a relatively largely spread electric field that attempts to align the liquid crystal molecules parallel to the field at f1, while electrode 14d generates a relatively localized electric field that attempts to orient the liquid crystal molecules perpendicularly to the electric field at f2. The fields from the electrodes 14c and 14d overlap as illustrated, however the liquid crystal molecules between electrodes 14c and 14d and electrode 15 are oriented as shown with a spatially compressed transition from substantially parallel orientation to substantially perpendicular orientation.

An example of a suitable frequency for f1 can be in the range of 1 kHz to 15 kHz depending on the properties of the layer 16 and the geometry of the LC cell. An example of a suitable frequency for f2 is typically above 30 kHz, for example 50 kHz, depending on the properties of the DFLC material and the temperature of operation.

Figure 4:
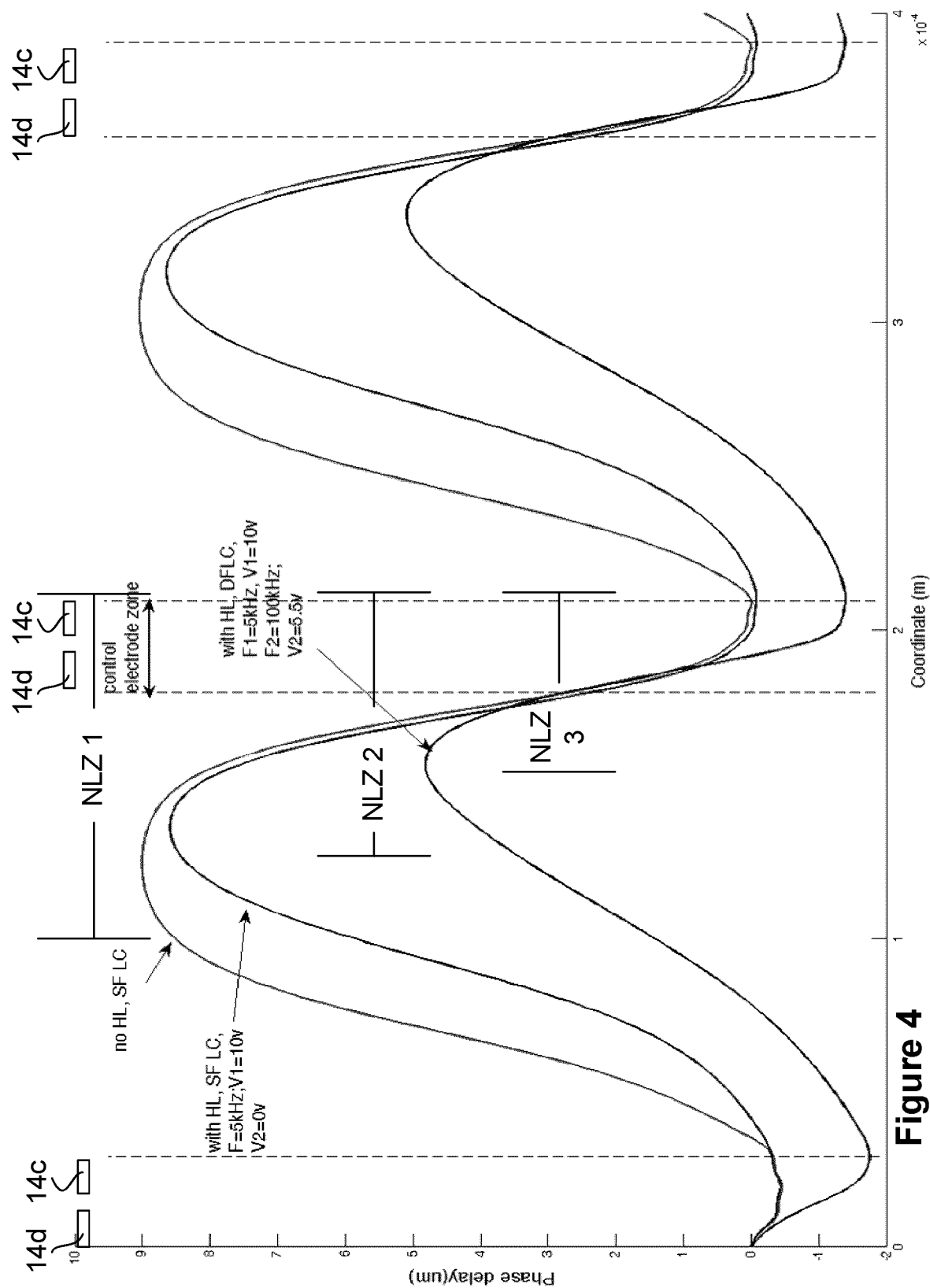
FIG. 4 is a graph of simulated liquid crystal orientation induced phase delay as a function of distance between electrodes for the embodiment of FIGS. 2 and 3, showing the non-linear zones (NLZ) for the two cases.

The net effect is to have electric fields at different frequencies that overlap, while their effect on the liquid crystal molecules is to cause the rapid change (both in time and space) in liquid crystal orientation at the boundary with a resulting compression in the NLZ as illustrated. In the simulation of FIG. 4, the parameters used are: liquid crystal layer 60 µm thick using MLC-2048 liquid crystal (a DFLC material from Merck), period of repeated beam steering cells of 150 µm, electrode width of 10 µm, gap between electrodes 14d and 14c of 10 µm, applied voltage of 10V at frequency f1 of between 5 kHz and 10 kHz with a voltage of 5.5 V at frequency f2 of 100 kHz. The vertical axis is the phase delay (in microns) of light traversing the LC cell.

The effect of this high frequency field is to cause the liquid crystal to orient in the direction perpendicular to the electric field. The combined effect of the control electrode 14d and the electrode 14c that provides the lower frequency electric field in the case of FIG. 3 causes the net orientation of the liquid crystal to be more at the peak than for the other cases of FIGS. 1 and 2, for which the control electrode 14d was simulated as being connected to 0V. However, the shape of the phase delay profile is greatly improved in that the NLZ is substantially reduced. One can see also that the minimum phase delay is also reduced for the case of FIG. 3, thus providing a variation in phase delay for FIG. 3 that is almost as great as for the simulations corresponding to the embodiments of FIGS. 1 and 2 using the same driving voltage for f1. The shape of the phase delay profile for the FIG. 3 case is also more linearly sloped (closer to an ideal sawtooth waveform) with less of a sinusoidal behavior.

It will be appreciated that the compression of the NLZ achieved for the embodiment of FIG. 3 can be obtained using the multiple segmented electrode system of FIG. 1, wherein the first electrode 14a of zone 12b would be driven with the high frequency voltage that would cause the liquid crystal to orient perpendicularly to the electric field.

Figure 5:
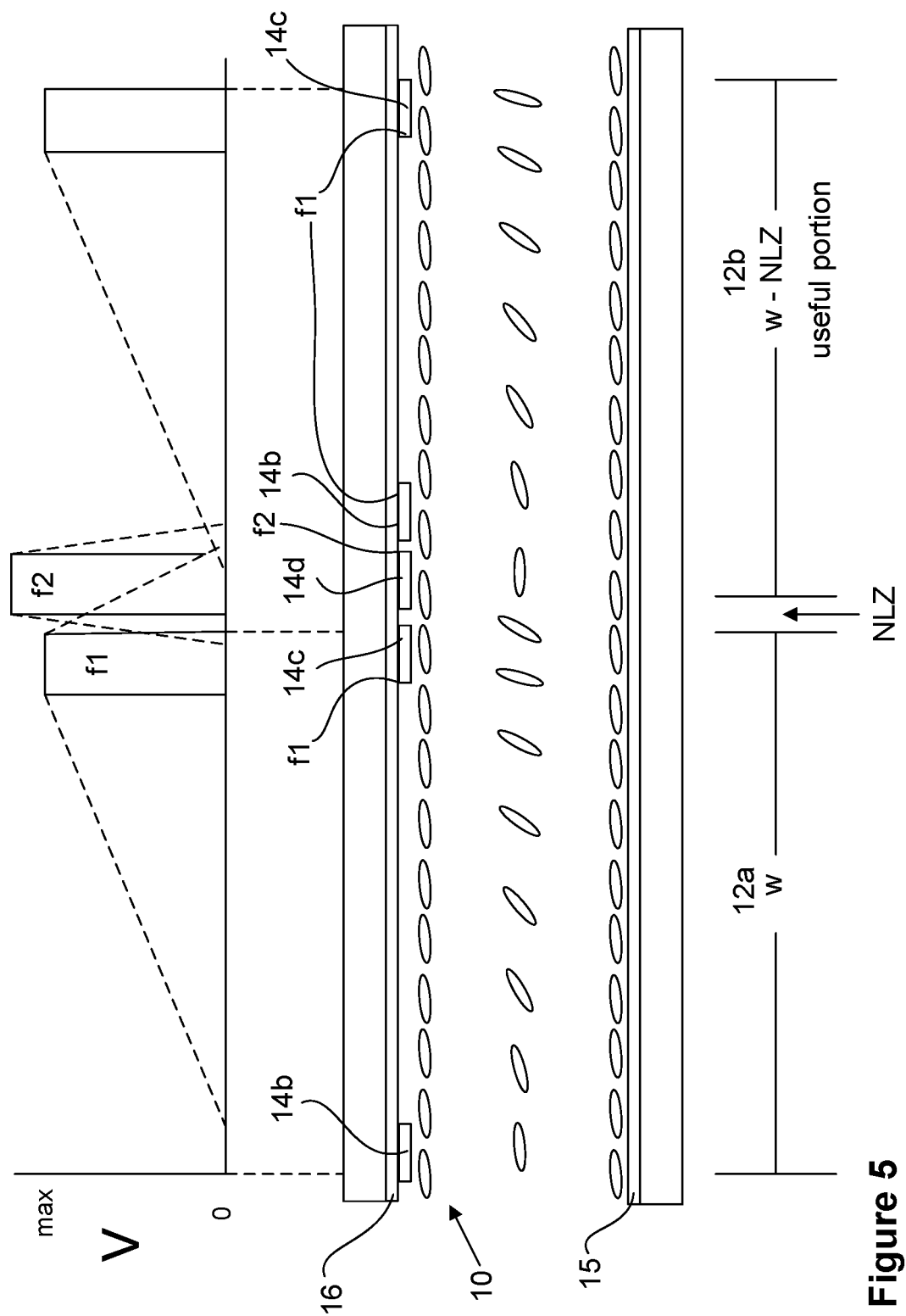
FIG. 5 is a schematic sectional diagram similar to FIG. 3 in which each zone has two electrode strips at frequency f1.

In the embodiment of FIG. 5, the (non-circular) hole-patterned (linear pairs of) electrodes of the zones 12a and 12b comprise electrodes 14b and 14c connected to min and max drive voltages at frequency f1. Electrode 14d connected to a drive voltage at frequency f2 is then positioned between electrodes 14c and 14b at the boundary between zones 12a and 12b. This provides better control over the spatial profile of the resulting (total) dielectric torque, and thus of the liquid crystal orientation. As will be appreciated, if a beam steering device is used to variably steer light in both directions, it is desirable to drive 14b with a maximum voltage and 14c with a minimum voltage when the steering is in the opposite direction (described previously). It will be appreciated that while separate electrodes 14c and 14d are provided to which the low and high frequencies are connected, the desired phase delay spatial profile can still be achieved using a single electrode supplied with both frequencies.

The liquid crystal device 10 schematically illustrated in FIGS. 1 through 5 comprises a single layer of liquid crystal aligned in one direction. As is known in the art, such a device acts on a single linear polarization of light, and unpolarized light passing through the device 10 is processed by the device as two linear polarization states. The spatial modulation of the index of refraction in the liquid crystal material is with respect to one polarization of light, while the other polarization has no spatial modulation of the index of refraction. To have such a device 10 work with unpolarized light, a second cell is typically provided with LC molecules oriented orthogonally to the LC molecules of the first cell illustrated in the FIGS. 1 to 5 to act on the other polarization. Electrodes 14 and 15 are provided for the additional cell in a manner similar to the first cell.

It is also known from international patent application publication WO2009/146530 published 10 Dec. 2009 to arrange four cells together, with alignment layers of two cells acting on the same polarization direction being in opposite directions. Such an arrangement reduces the sensitivity or image aberrations of the device 10 to light that is not parallel to the optical axis of the device as the light passes through the device.

FIG. 6 illustrates a schematic plan view of a beam steering device showing zones 12a, 12b, 12c, 12d and 12e that together create an aperture 18. The arrangement of the electrodes 14b, 14c and 14d according to the arrangement of FIG. 5 is schematically illustrated with the electrodes connected to a suitable drive circuit 20.

Given the typical dimensions of a liquid crystal cell, namely a cell gap between substrates of about 120 microns, and a Δn of about 0.2, it would be desirable to have a zone width in a device as illustrated schematically in FIG. 6 of about 100 microns to provide a beam steering range of about +/−13 degrees. If the aperture 18 of the device is to be 3 mm across, then there would be 30 zones 12 arranged instead of the five that are schematically illustrated in FIG. 6.

The drive circuitry for such a device can be done using dedicated circuitry, FPGA devices, DSP devices and can include a programmed processor for control. As schematically illustrated, the drive circuitry 20 has driver 22 operating at frequency f1 for the left electrodes 14b, a driver 24 operating a frequency f1 for the right electrodes 14c and a driver 26 operating at frequency f2 for electrodes 14c. Not shown in FIG. 6 is that the driver circuit 20 is also connected to the corresponding planar electrode 15. Such drivers 22, 24, 26 can be controllable to be simply on or off, or they can be variably adjustable to control the variably controllable optical parameter, namely the beam steering angle. The drivers 22, 24 can also be frequency tunable and/or voltage tunable. The driver 26 can be fixed in voltage and frequency, although control over its drive signal parameters is also possible. A controller 28 is provided as part of the driver circuitry 20 in the embodiment of FIG. 6 to provide the settings of the drivers 22, 24, 26 in response to an external control signal input. Such a controller 28 can be provided separately from the drivers 22, 24, 26, for example in software. The controller 28 typically has stored calibration data to allow a control signal to be translated into specific driver signal values. Phase delay control between control signals can also be implemented for example as described herein with reference to FIGS. 10A, 10B and 10C.

While FIG. 6 illustrates a beam steering device that shifts light from right to left (or vice versa, in the same plane), it will be appreciated that by stacking additional cells with electrodes arranged orthogonally, the beam steering device can steer light in two directions, namely left-right and up-down.

Figure 7A:
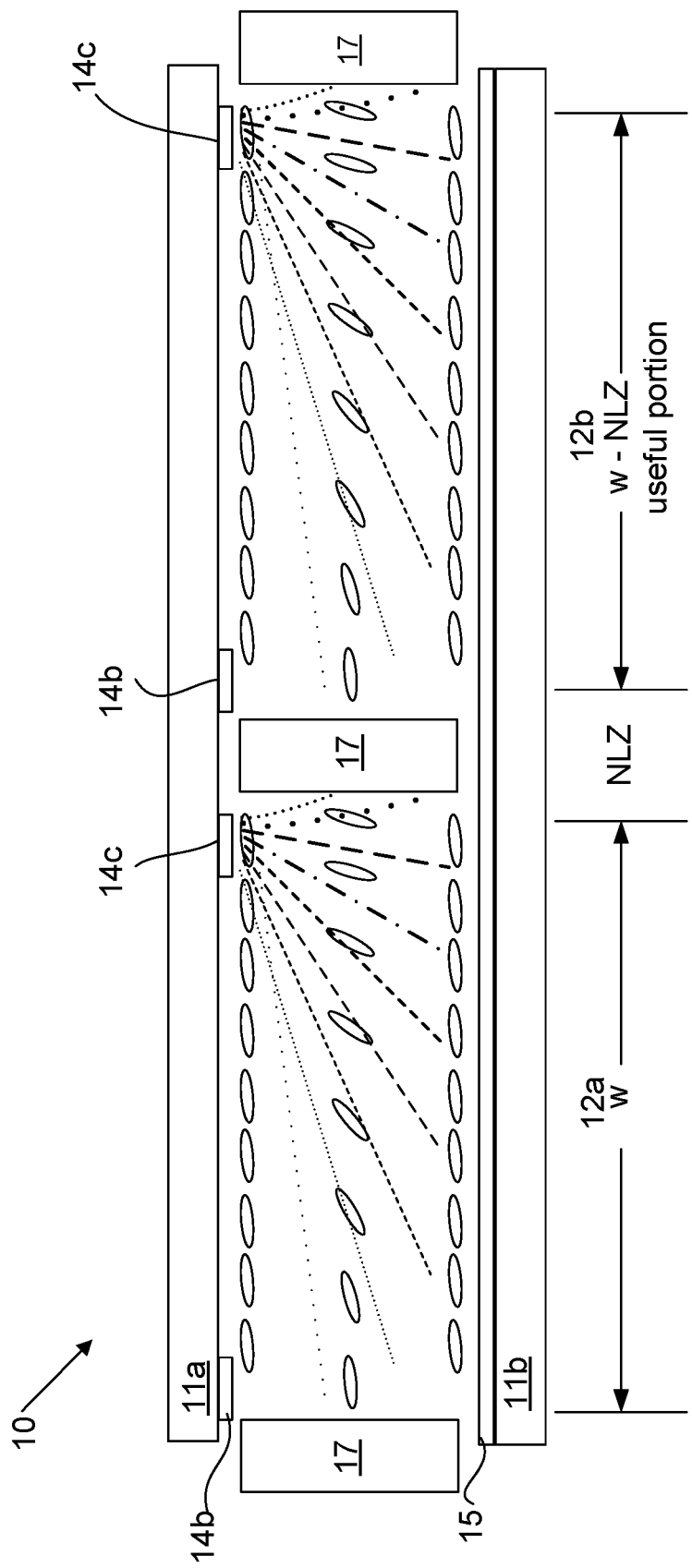
FIG. 7A is a schematic cross-sectional diagram across neighboring zones or beam steering elements of a LC beam steering device, in which control of the electric field is provided by two control electrodes per zone employing a conductive wall in the transition zone, in accordance with the proposed solution.

In accordance with another embodiment of the proposed solution, FIG. 7A illustrates neighboring zones 12 or beam steering elements 12 of a LC beam steering device 10, in which control of the electric field is provided by two control electrodes 14c and 14b per zone 12 employing a conductive wall 17 in the transition zone to reduce the fringing field of each element 12 from penetrating into the next zone and which forms the NLZ. Conductive walls 17 can be shorted to planar electrode 15. To steer in a given direction, electrode 14c can be activated while electrodes 14b, 15 and the conductive wall 17 are connected to the same voltage (or grounded). This has been found to reduce the NLZ and to increase potential linearity (prism-like) in each zone 12 and improve beam steering (or in a circular geometry improve Fresnel lens operation efficiency).

For clarity, connecting electrode 14b and the conductive wall 17 to the same voltage can be selectively achieved externally in driver circuit 20. An isolation layer (not shown) can be employed between electrodes 14c/14b and conductive wall 17. For example, the incident light can be steered in the opposite direction by connecting electrodes 14c, 15 and conductive wall 17 to the same voltage (or grounded) while electrode 14b is activated.

Figure 7B:
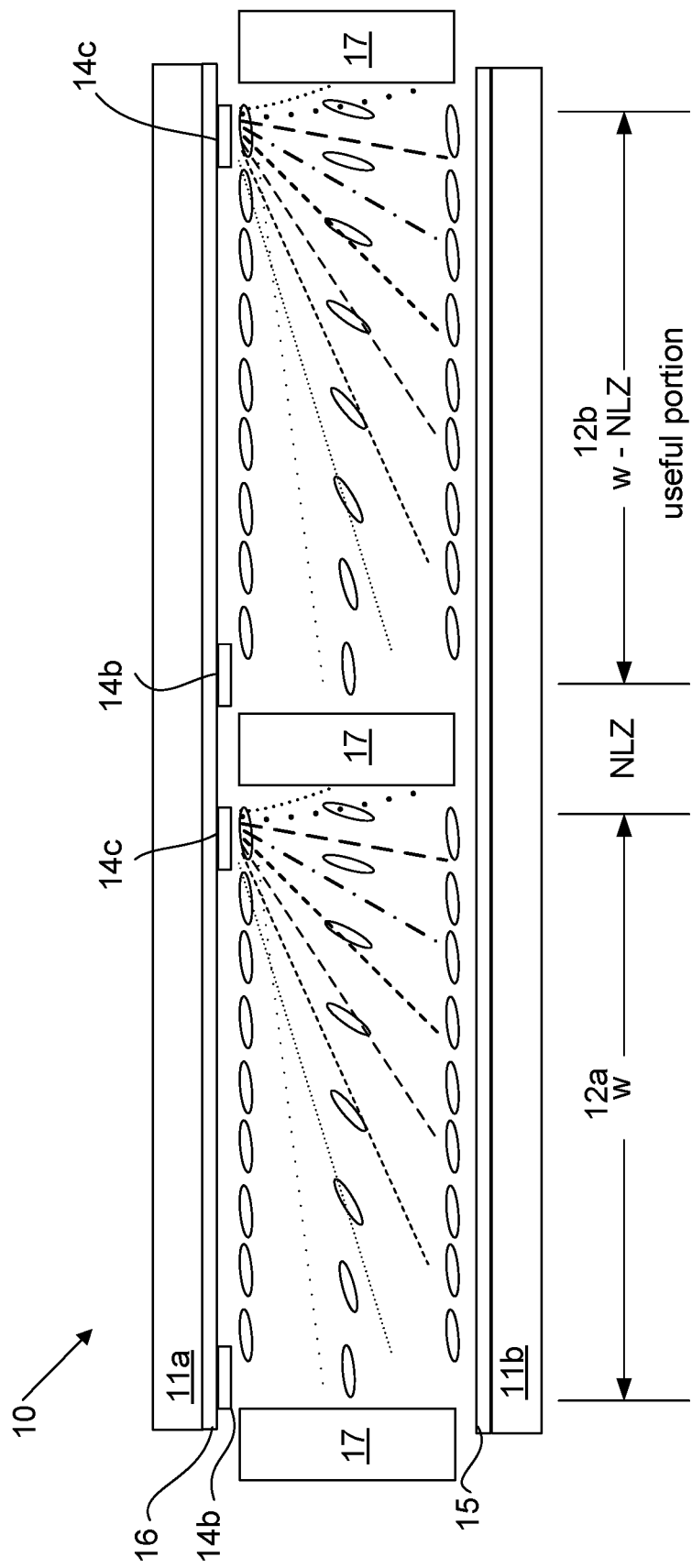
FIG. 7B is a schematic cross-sectional diagram across neighboring zones or beam steering elements of a LC beam steering device for FIG. 7A, in which control of the electric field enhanced by the use of a layer of a weakly conductive material to help extend the electric field across each zone, in accordance with the proposed solution.
Figure 7C:
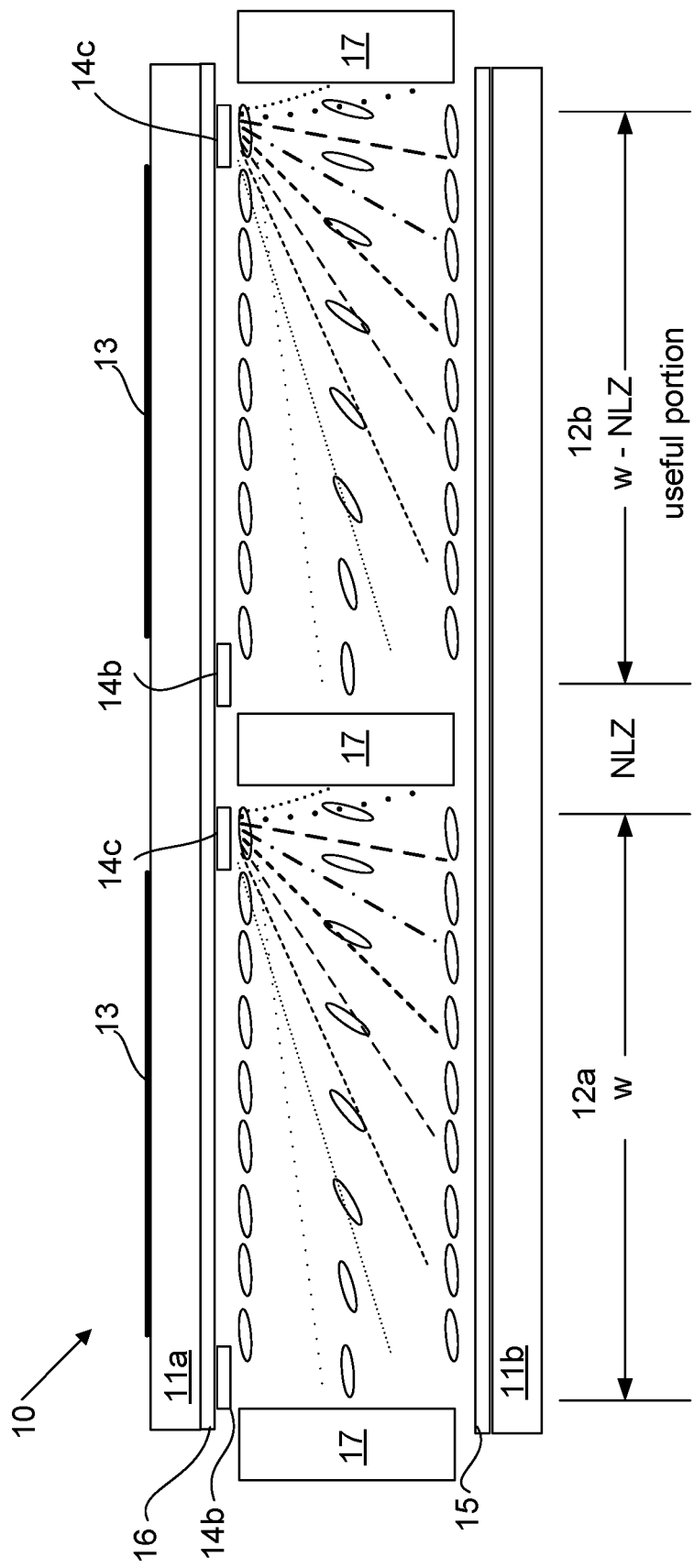
FIG. 7C is a schematic cross-sectional diagram illustrating another LC beam steering device as illustrated in FIG. 7B having an electrically floating electrode, in accordance with another embodiment of the proposed solution.

FIG. 7B illustrates another embodiment of the proposed solution employing a weakly conductive or highly resistive layer (WCL) 16 in the optical device geometry illustrated in FIG. 7A. An improved sawtooth profile can be provided by controlling the frequency of the drive signal components supplied to electrodes 14b and 14c. The use of a floating electrode 13, in accordance with a further embodiment of the proposed solution, is illustrated in FIG. 7C, to improve the electric field profile to obtain a more linear prism-like modulation profile. The use of a floating electrode can be used in conjunction with other embodiments, for example, with embodiments shown in FIGS. 2 to 6.

In accordance with another embodiment of the proposed solution, FIG. 8A illustrates neighboring zones 12 or beam steering elements 12 of a LC beam steering device 10 having two stacked LC layers (these layers need not be immediately adjacent or staggered by a full zone width), in which control of the electric field is provided by one control electrode (alternating 14e/14f) per zone 12 employing wide optically transparent walls 19 extending in every other inactive element zone 12 in each LC layer however in a staggered pattern between LC layers.

Transparent walls 19 can permit the electric field to penetrate therethrough providing a smooth electric field transition between active and inactive optical device elements 12 under the active electrode 14e or 14f. To steer in a given direction, electrode 14f can be activated while electrodes 14e and 15 are connected to the same voltage (or grounded). To have the same behavior in both the top and the bottom cells, the geometry of the electric field and the alignment direction can be the same as shown in FIG. 8A.

The arrangement of FIG. 8A has been found to essentially eliminate the fringing field induced undesired reorientation of LC under the active electrode 14f in each zone 12 (since there is no LC in that area) and thus to improve phase delay operation. The incident light can be steered in the opposite direction by connecting electrodes 14f and 15 to the same voltage (or grounded) while electrode 14e is activated. Each LC layer operates with half the number of active optical device elements 12 while light incident on each inactive optical device element 12 in one LC layer is steered by a corresponding active optical device element 12 in the other LC layer.

Figure 8B:
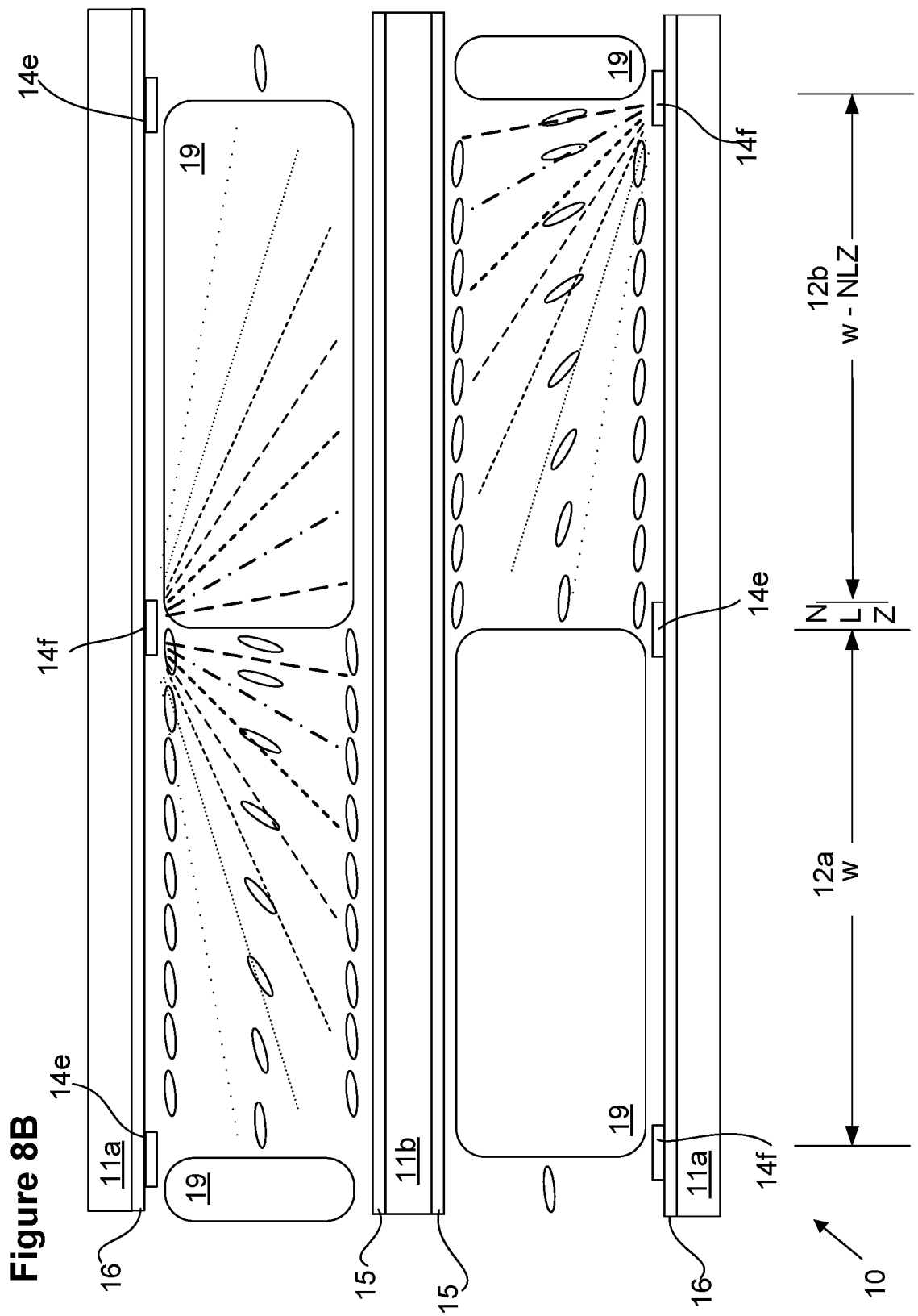
FIG. 8B is a schematic cross-sectional diagram across neighboring zones or beam steering elements of a LC beam steering device for FIG. 8A, in which control of the electric field enhanced by the use of a layer of a weakly conductive material to help extend the electric field across each zone, in accordance with the proposed solution.
Figure 8C:
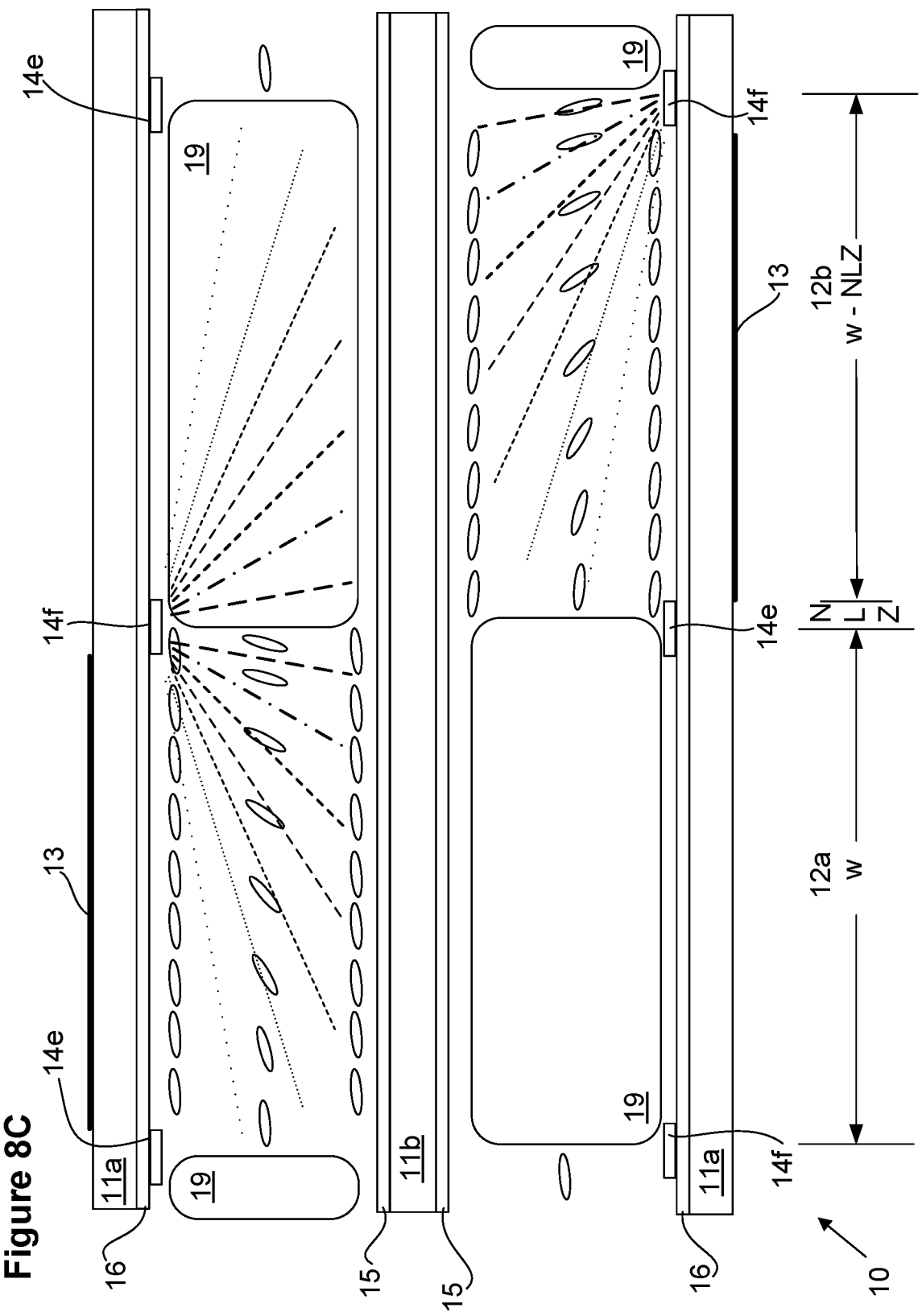
FIG. 8C is a schematic cross-sectional diagram illustrating another LC beam steering device as illustrated in FIG. 8B having an electrically floating electrode, in accordance with another embodiment of the proposed solution.

FIG. 8B illustrates another embodiment of the proposed solution employing a WCL 16 in the optical device geometry illustrated in FIG. 8A. An improved sawtooth profile can be provided by controlling the frequency of the drive signal components supplied to electrodes 14e and 14f. The use of a floating electrode 13 for each active element zone 12, in accordance with a further embodiment of the proposed solution, is illustrated in FIG. 8C, to improve the electric field profile to obtain a more linear prism-like modulation profile in each element zone 12.

Figure 9A:
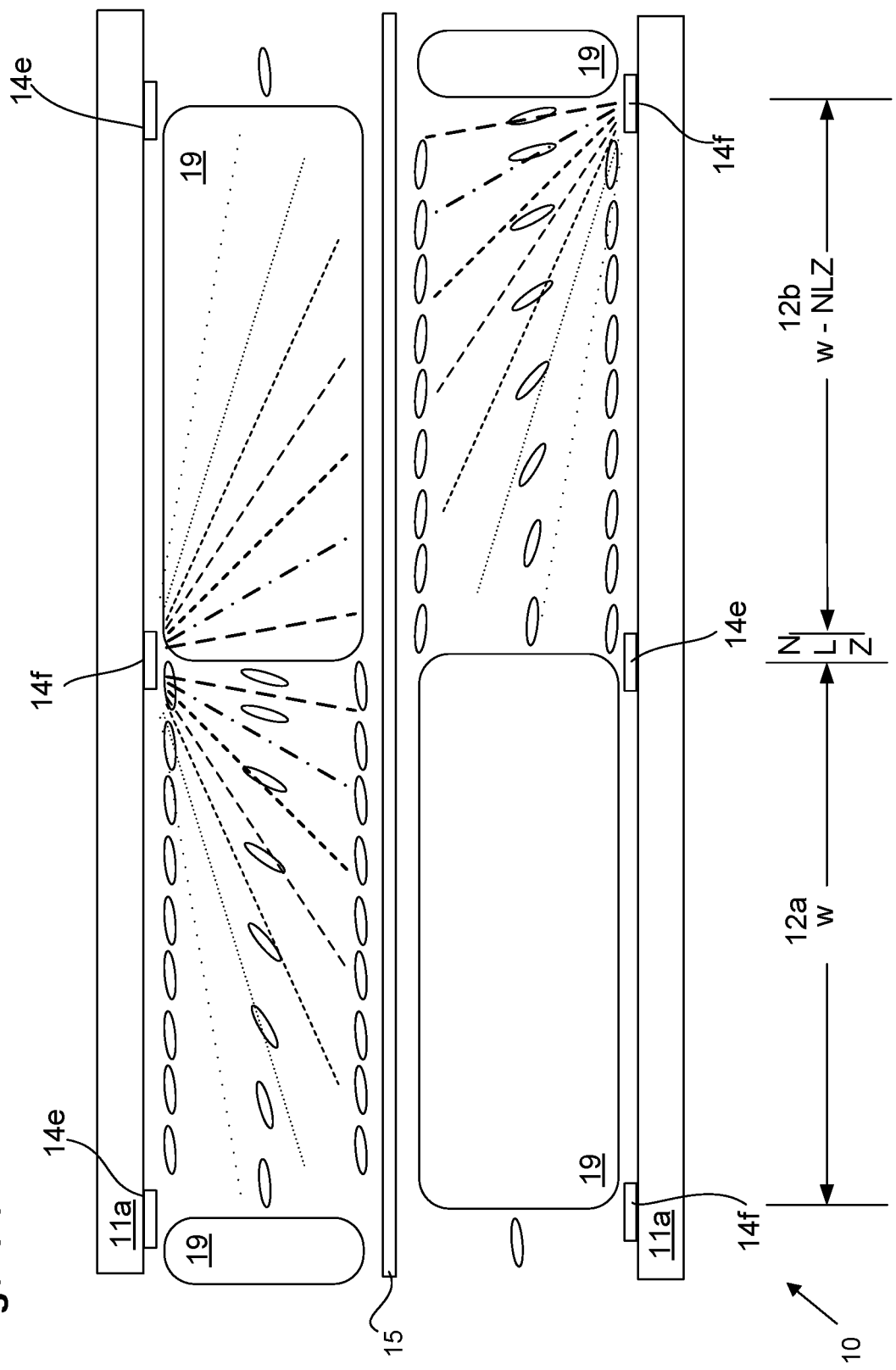
FIG. 9A is a schematic cross-sectional diagram across neighboring zones or beam steering elements of a dual LC layer beam steering device, in which control of the electric field is provided by one control electrode per zone employing staggered wide optically transparent walls in every other element zone, in accordance with the proposed solution.

In accordance with another embodiment of the proposed solution, FIG. 9A illustrates neighboring zones 12 or beam steering elements 12 of a dual LC layer beam steering device 10 employing staggered wide optically transparent walls 19 extending in every other inactive element zone 12 in each LC layer, in which control of the electric field is provided by one control electrode (alternating 14e/14f) per zone 12. In the embodiments of FIGS. 8A, 8B and 8C, there exists the possibility for light steered by the front LC layer to be steered again by the back LC layer thereby representing a different cause affecting the NLZ. This has been found to decrease light output in each zone 12. In order to decrease losses due to this resteering and improve phase delay operation, the central substrate 11b is omitted in the optical device layered geometry. During wafer level manufacture, electrode layer 15 (and associated alignment layers) is deposited on each transparent wall 19. Flip-chip fabrication techniques can be employed to mate the staggered electrode strips into electrode layer 15 illustrated. The LC material can be dispensed into the active optical device element zones 12, for example by vacuum, injection or capillary action.

Figure 9B:
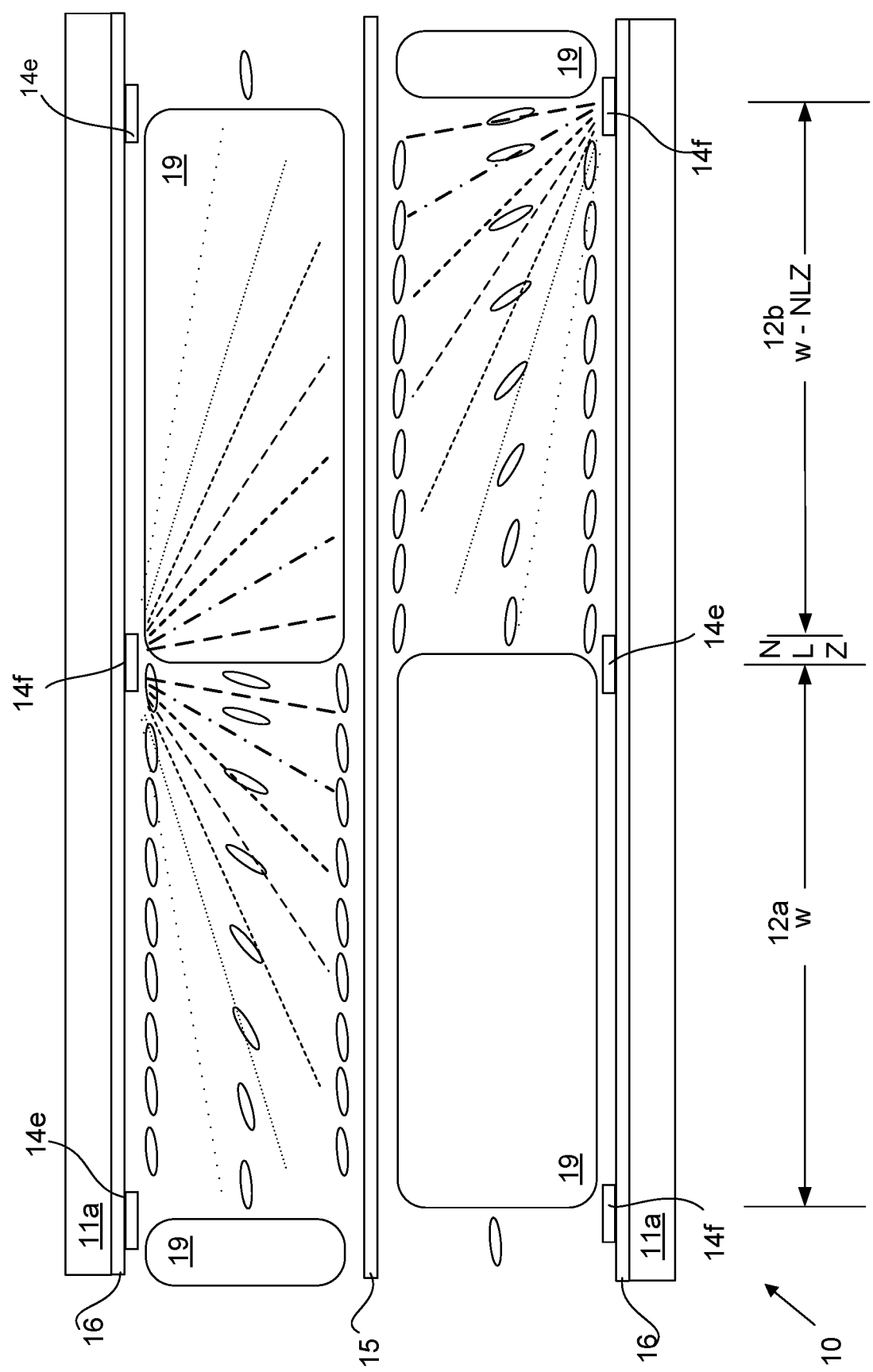
FIG. 9B is a schematic cross-sectional diagram across neighboring zones or beam steering elements of a LC beam steering device for FIG. 9A, in which control of the electric field enhanced by the use of a layer of a weakly conductive material to help extend the electric field across each zone, in accordance with the proposed solution.
Figure 9C:
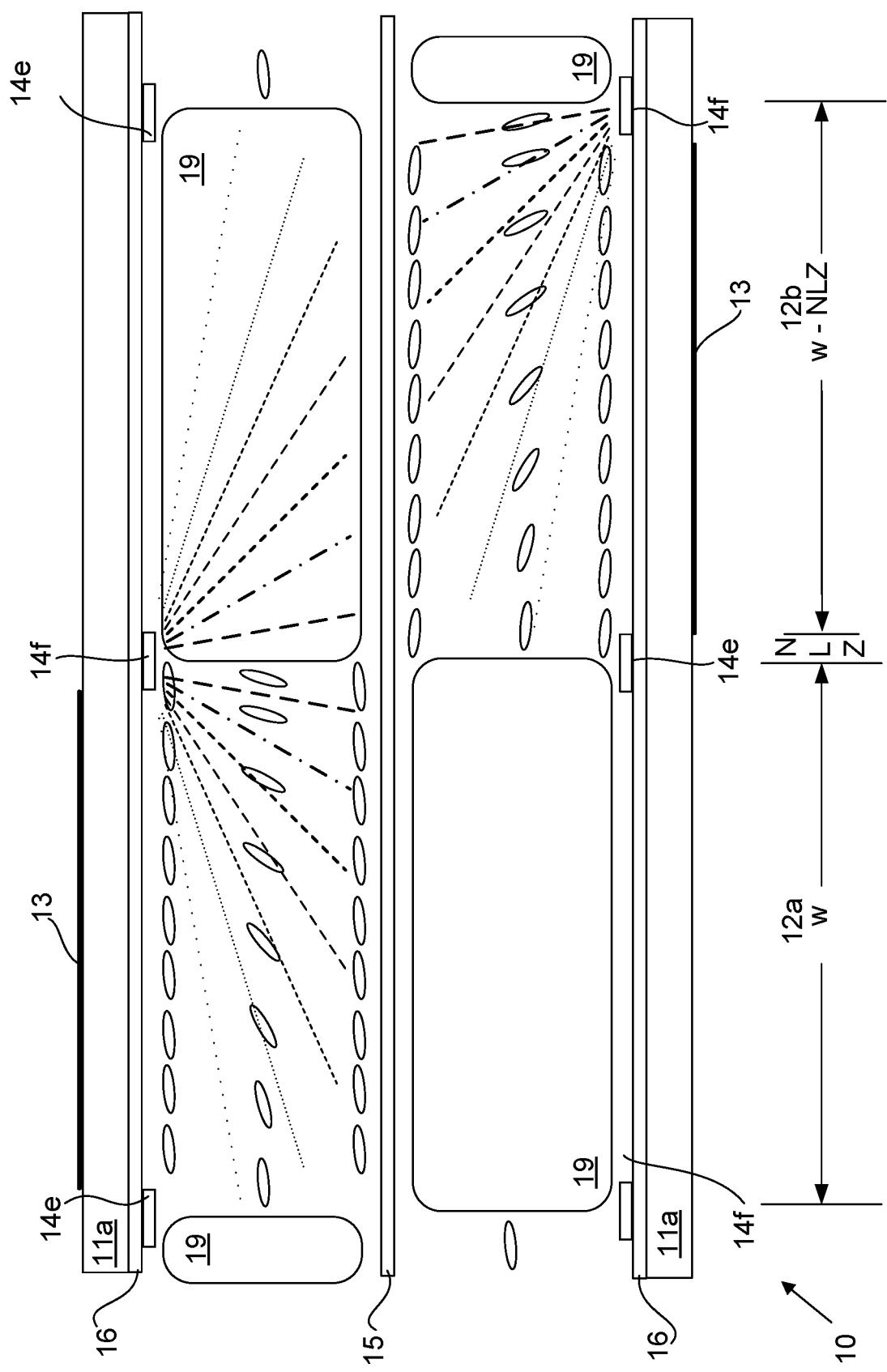
FIG. 9C is a schematic cross-sectional diagram illustrating another LC beam steering device as illustrated in FIG. 9B having an electrically floating electrode, in accordance with another embodiment of the proposed solution.

FIG. 9B illustrates another embodiment of the proposed solution employing a WCL 16 in the optical device geometry illustrated in FIG. 9A. An improved sawtooth profile can be provided by controlling the frequency of the drive signal components supplied to electrodes 14e and 14f. The use of a floating electrode 13 for each active element zone 12, in accordance with a further embodiment of the proposed solution, is illustrated in FIG. 9C, to improve the electric field profile to obtain a more linear prism-like modulation profile in each element zone 12.

Figure 10A:
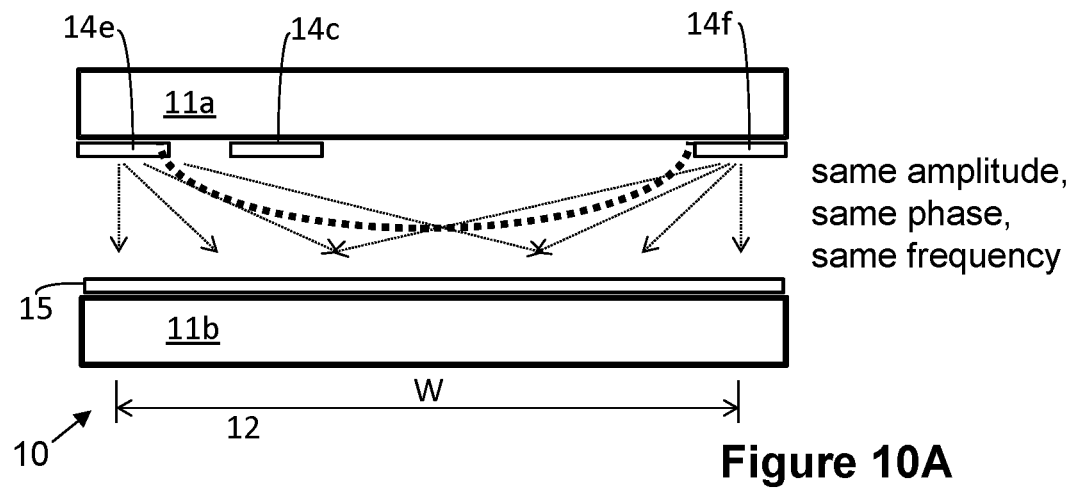
FIG. 10A is a schematic cross-sectional diagram across a single zone or beam steering element of a LC beam steering device having two active electrodes driven by drive signal components of same frequency, phase and amplitude in a non-steering state, in accordance with an embodiment of the proposed solution.

In accordance with another embodiment of the proposed solution, FIG. 10A illustrates a single zone or beam steering element 12 of a LC beam steering device 10 having two active electrodes 14e and 14f each of which are driven by corresponding drive signal components each having an amplitude, frequency and phase. The resulting potential profile across the zone element 12 is cambered as illustrated by the dashed line, for example by employing a 5V drive signal on 14e and 14f (same phase and same frequency) with respect to electrode 15. In this state the element zone 12 does not provide beam steering. For reference, unconnected electrode 14c is illustrated to confirm that shaping the potential profile in accordance with this embodiment is possible in other optical device geometries without departing from the proposed solution.

Figure 10B:
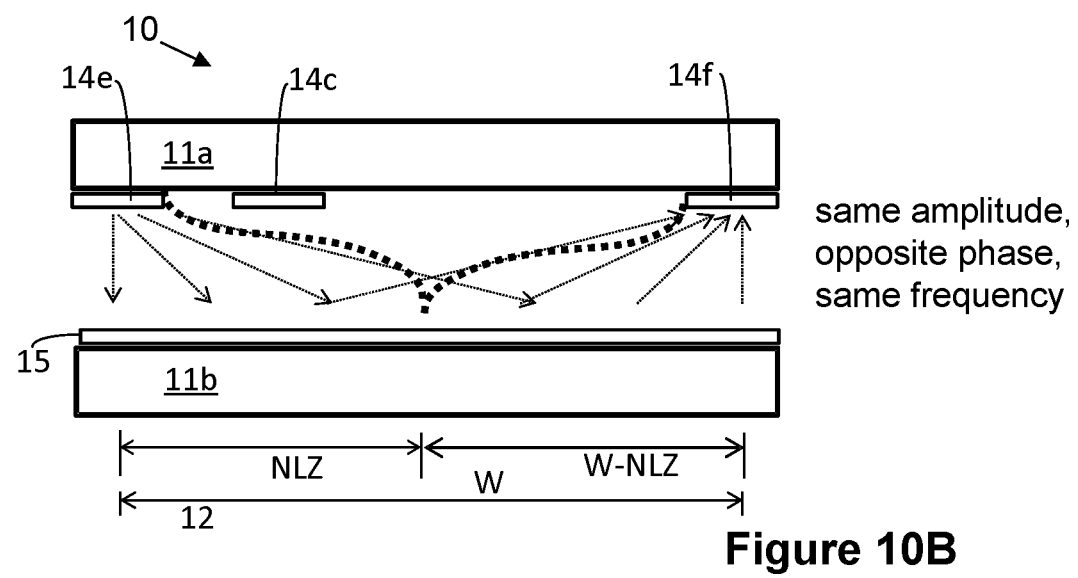
FIG. 10B is a schematic cross-sectional diagram across a single zone or beam steering element of a LC beam steering device of FIG. 10A wherein the two active electrodes are driven by drive signal components of same frequency and phase but opposing amplitude, in accordance with an embodiment of the proposed solution.
Figure 10C:
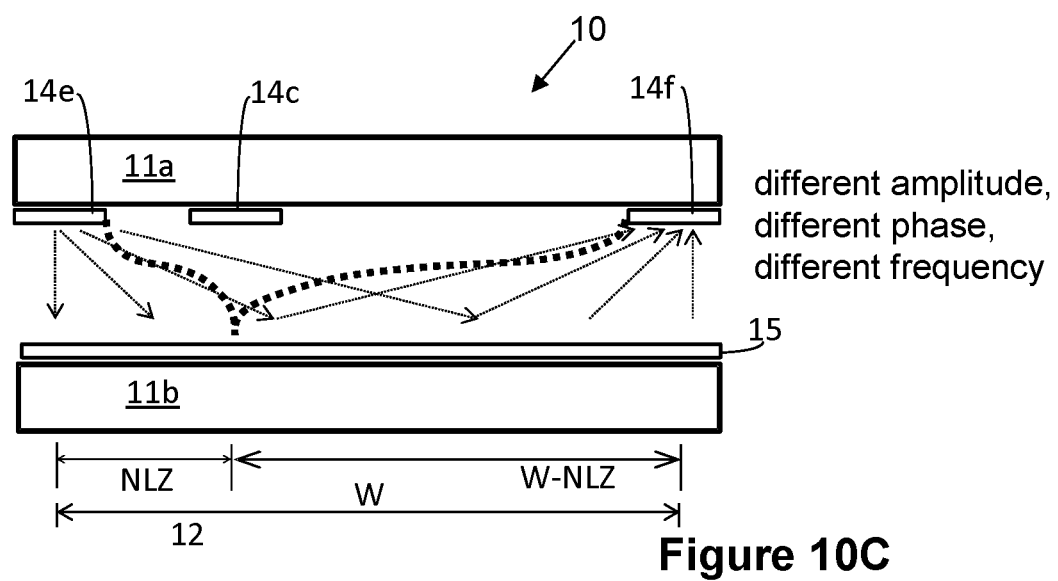
FIG. 10C is a schematic cross-sectional diagram across a single zone or beam steering element of a LC beam steering device of FIG. 10A wherein the two active electrodes are driven by drive signal components of same frequency and phase but different opposing amplitudes, in accordance with an embodiment of the proposed solution.

FIG. 10B illustrates the two active electrodes 14e and 14f of FIG. 10A being driven by corresponding drive signal components of same frequency and amplitudes, but in opposing phases. Beam steering can be provided by driving electrode 14e at 5V and electrode 14f at −5V wherein the potential profile of the electric field causes the orientation of the LC molecules to have inflection point in the middle of the zone element 12. FIG. 10C illustrates the two active electrodes 14e and 14f of FIG. 10A being driven by corresponding drive signal components of different frequencies, phase and amplitudes. When the frequency is the same and there is a phase shift, such as 180 degrees, then there is a substantial electric field component between the electrodes and thus extending along an extent of the liquid crystal layer. When the frequency of the drive signals is different, then the voltage between the electrodes 14e and 14f is an alternating voltage with a beat frequency, and this voltage provides an electric field along an extent of the liquid crystal layer. Beam steering can be varied by driving electrode 14f at 5V and electrode 14e at −2V wherein the potential profile of the electric field causes the orientation of the LC molecules to move the inflection point from the center to one side of the zone element 12.

In-Plane Field Control

Beam control devices are optical devices that control a beam of light either with respect to the beam divergence or convergence or with respect to the beam direction, namely for beam steering purposes.

In the case of liquid crystal devices, an electric field is typically used to control an orientation of the liquid crystal material. The change in orientation affects the index of refraction and can create what is known as a gradient index (GRIN) lens. For beam control, a focusing lens may not be required.

When the aperture of the device is large, beam steering at large angles is difficult with a liquid crystal GRIN device due to relatively small variations in the index of refraction over the aperture. By using a number of beam control elements over the aperture, smaller optical elements with a smaller aspect ratio can provide for greater beam steering ability.

The electric field can be spatially modulated over the aperture of a liquid crystal optical device to spatially modulate the liquid crystal orientation. For lenses, it can be desirable to have a smooth variation of orientation control over the aperture, without using a number of lens elements to form a lens. In the case of beam control devices, the use of a number of elements can be desirable as mentioned above, and the profile of the electric field over the small aperture area of each element and its interaction with the liquid crystal can be different from larger aperture devices.

In some beam control devices, the controlling electric field is provided using electrodes arranged on opposed sides of the liquid crystal layer, and in others, the electric field is provided by electrodes arranged on one substrate (11a/11b) containing the liquid crystal layer.

Nematic liquid crystal when oriented using a rubbed alignment layer can affect only one polarization of incident unpolarized light. To modulate unpolarized light, two, orthogonally oriented layers of liquid crystal are commonly used. The first layer causes the light to be split into two orthogonal polarizations, only one of the polarizations having been modulated in accordance with the liquid crystal spatial modulation, while the other polarization is essentially unmodulated. The second layer is arranged to provide the desired complementary modulation on the polarization that was unmodulated by the first layer, and lets the modulated polarization from the first layer pass through with little modulation.

For beam steering purposes, it is possible to use a first liquid crystal layer to controllably steer light of one polarization in one direction, while a second liquid crystal layer is used to controllably steer light of the other polarization in an orthogonal direction.

Figure 11:
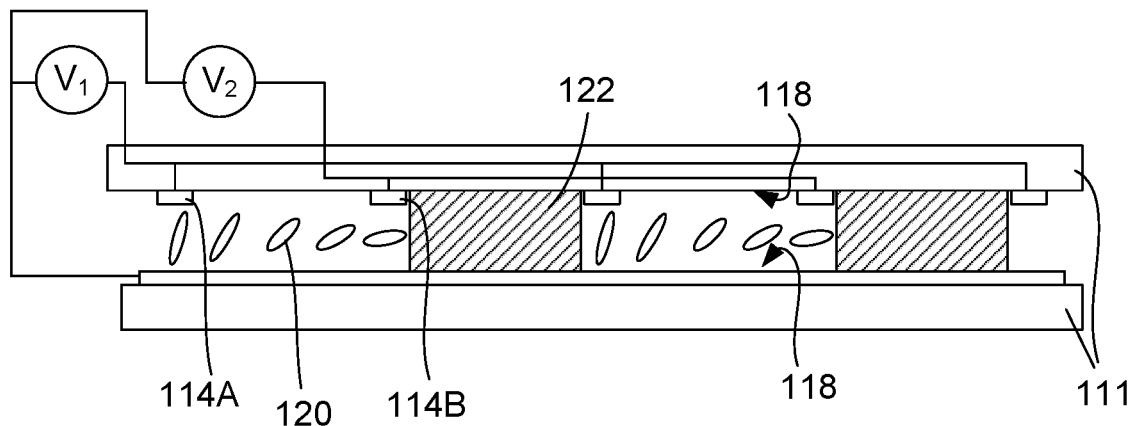
FIG. 11 is a schematic cross-section illustration of a beam steering optical device having a patterned electrode with four beam shaping elements within a liquid crystal cell in which strip electrodes are on one substrate and a planar electrode is on an opposed substrate of the cell, in accordance with an embodiment of the proposed solution.

This can be better understood with reference to FIG. 11 which illustrates schematically a device having a single liquid crystal layer 120 that has interconnected, parallel strip electrodes 114 on one substrate 111 separated by an electrode gap g with a transparent planar electrode 115 arranged on another opposed substrate 111 to provide a control electric field across the liquid crystal layer having a thickness L (this thickness is sometimes known as the cell gap). The strip electrodes 114 can also be transparent even if they are typically only 10 to 20 microns wide and would not block much light transmission. An alignment layer 118 of a rubbed polymer is provided over the internal surfaces of both substrates 111 to provide an initial ground state orientation to the liquid crystal 120. The strip electrodes 114 are preferably provided on the substrate side from which light enters the cell, although they can also be provided on the opposed substrate 111.

The device 100 illustrated schematically and not to scale shows in cross-section four electrode gaps each providing a controllable cylindrical lens element for beam control. The arrangement of electrodes 114 can be linear (i.e. fingers), concentric rings, a spiral or any other geometric configuration. The number of electrode gaps over a beam aperture can vary according to the application.

When a voltage is applied across electrodes 114 and 115 in FIG. 11 (see the field lines illustrated on the right cell), the electric field is stronger in the space below the electrodes 114 and 115 than over the gaps between the electrodes. A layer of a highly resistive material can be added near the electrodes 114 to help distribute the electric field over the gap, however when the aspect ratio of the gap to liquid crystal layer thickness is relatively small, then such a highly resistive material layer may not be of much benefit.

A layer of nematic liquid crystal material 120 controls a single polarization of light. As is known in the art, such layers can be stacked together so that the device can module both linear polarizations of light. In the embodiment of FIG. 11, the liquid crystal material 120 is shown to have an alignment almost parallel with the substrate such that its ground state would have a low pre-tilt angle from left to right. To modulate the orthogonal polarization, another layer of nematic liquid crystal can be provided to have an alignment parallel with the substrate extending into or out of the page. In this configuration, a transparent (and preferably optically matched) filler 122 of desired dimensions is provided to separate the liquid crystal or the electric field of neighboring cells. A first controllable voltage source V1 is connected across strip electrodes 114A and an opposed planar electrode 115, and a second controllable voltage source V2 is connected across electrodes 114B and the opposed planar electrode 115. The voltages V1 and V2 determine the liquid crystal orientation and thus the direction of tilt of the beam steering. The filler can be any suitable material, preferably a transparent material, and also preferably one having an index of refraction similar to the liquid crystal material. In contrast, the separation of electric fields of neighboring cells will be possible only if the filler 122 is conductive and controlled. The phase delay profile of the liquid crystal between two fillers 122 can have a desirable beam steering quality.

Furthermore, for beam control purposes, the strip electrode pattern shown in FIG. 11 can be used to cause beam steering in one direction only. For beam steering in two directions, additional layers can be used with a pattern of control electrodes 114 that are orthogonal.

Figure 12:
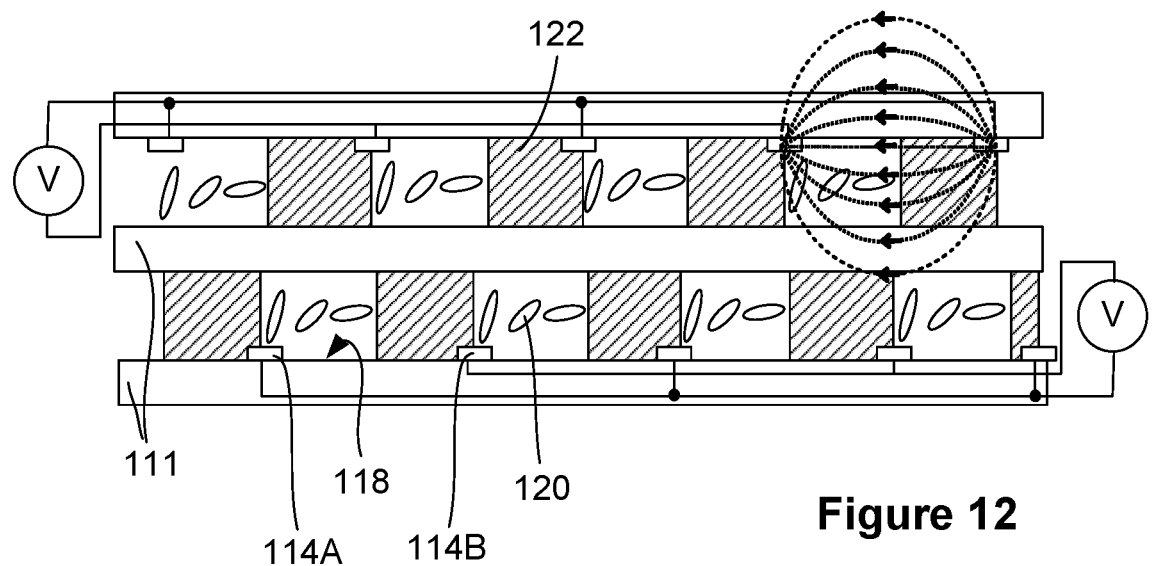
FIG. 12 is a schematic cross-section illustration of a beam steering optical device having four beam shaping elements within a liquid crystal cell in which strip electrodes are on one substrate of the cell to form an in-plane and fringe electric field between the electrodes, in accordance with an embodiment of the proposed solution.

Similar to FIG. 11, FIG. 12 shows a device having a single liquid crystal layer 120 that has, on one substrate 111, independent electrodes 114A and 114B separated by a gap to provide a control electric field between the electrodes that is spatially variable in the liquid crystal below the gap. When a voltage is applied across electrodes 114A and 114B in FIG. 12 (see the field lines illustrated on the two cells on the right), the electric field follows a geometry that is essentially in a direction parallel to the direction between the electrodes at a midpoint of the gap, while it turns to be essentially perpendicular to the direction between the electrodes at the edge of the gap where there is no filler 122. The control field has a very different geometry than that of FIG. 11, however the liquid crystal orientation under conditions of the applied voltage is similar (but not identical). In this embodiment, the transparent material 122 does not respond to the electric field and is provided such that the beam steering index of refraction profile can be provided with the liquid crystal 120 cells and the transparent material 122 being arranged in a staggered manner on two layers. This will provide a "left or right" tilting capacity of a single polarization of light in the plane of the drawing.

The embodiment of FIG. 12 has the disadvantage over the embodiment of FIG. 11 that it can only control steering in one direction. To steer in the other direction, one would use either separate cells for that purpose, or alternatively, if a dual frequency liquid crystal is used, then a higher frequency above the cross-over frequency can be used to cause a liquid crystal alignment orthogonal to the electric field, and thus provide the desired profile for steering in the other direction.

In FIG. 12, the aspect ratio (R) of the spacing (g) between the electrodes 114A and 114B and the thickness of the liquid crystal layer (L), R=g/L, can be, for example, between 0.7 and 4 (preferably about 2.5 for a microlens application) without using any weakly conductive coating on or at the insulating substrate 111 on which the electrodes 114A and 114B are located. For example, g can be about 100 microns, while L can be about 50 microns for an aspect ratio of about 2. This aspect ratio plays an important role in determining the desired electric field spatial variation as described above. The electrodes 114A and 114B are shown arranged on a cell inside side of the substrate 111, however, they can also be located on an outside side of the substrate 111. This latter arrangement may require a higher drive signal voltage, however, the electric field geometry can be more suitable for modulating the electric field within the liquid crystal material.

Figure 13A:
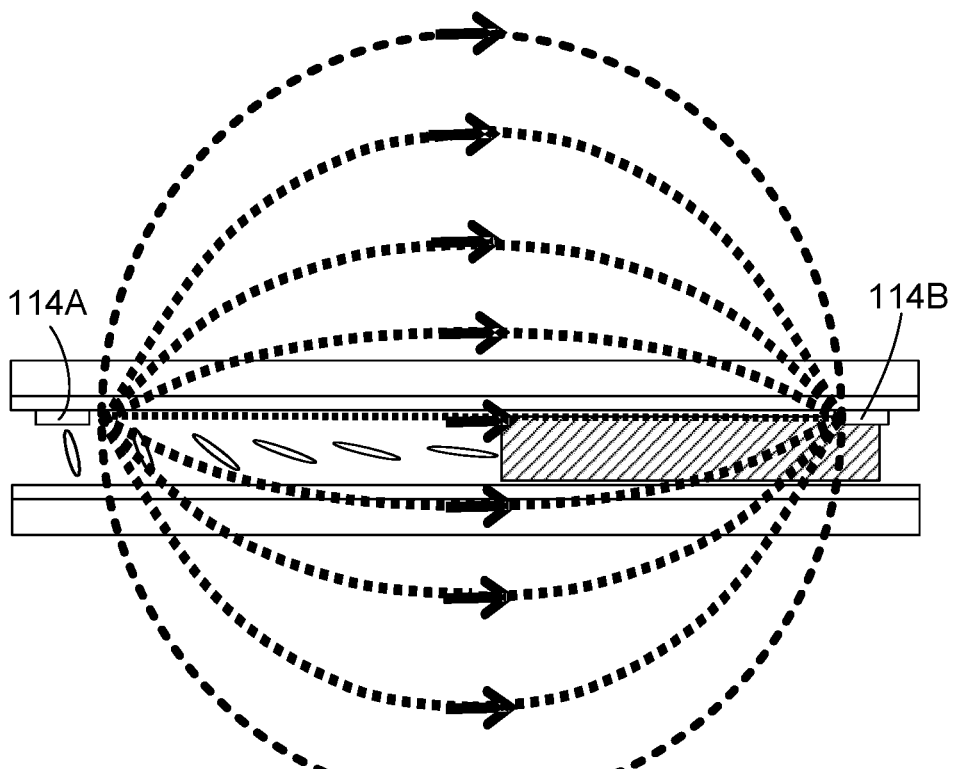
FIG. 13A is an enlarged view of a variant of one element of the cell of FIG. 12 in which the aspect ratio of strip electrode gap to cell gap thickness is large, in accordance with an embodiment of the proposed solution.
Figure 13B:
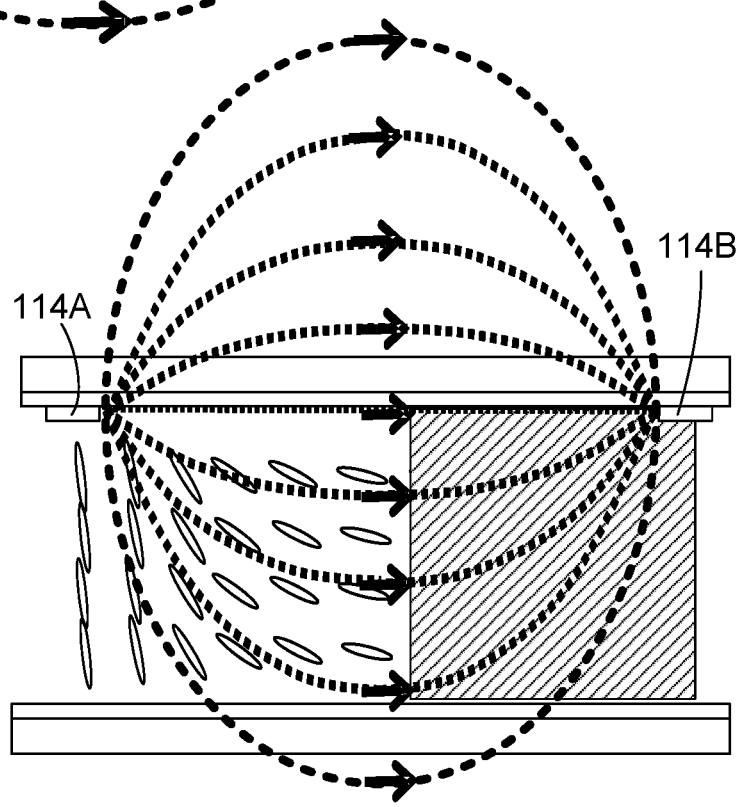
FIG. 13B is an enlarged view of a variant of one element of the cell of FIG. 12 in which the aspect ratio of strip electrode gap to cell gap thickness is small, in accordance with an embodiment of the proposed solution.
Figure 13C:
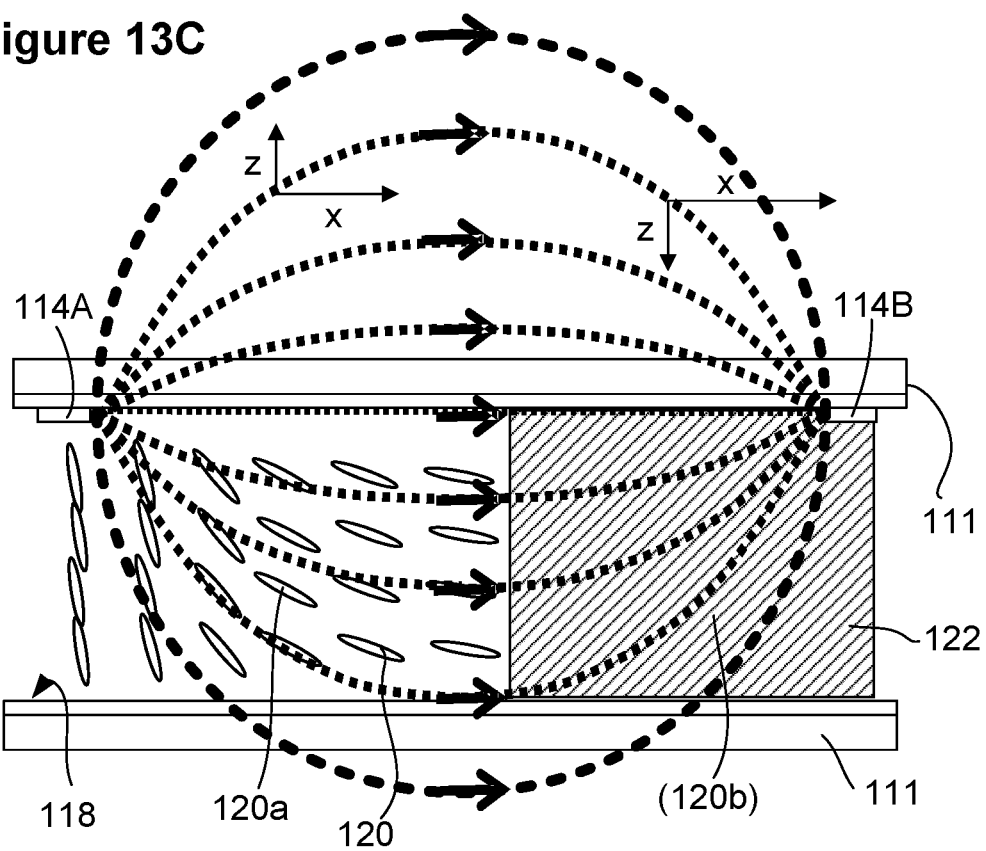
FIG. 13C is an enlarged view of one element of the cell of FIG. 12, in accordance with an embodiment of the proposed solution.

FIGS. 13A to 13C illustrate schematically in greater detail the electric field generated from a single pair of parallel strip electrodes 114A and 114B similar to those of FIG. 12. FIG. 13A illustrates an aspect ratio of about 5. The electric field lines in the cell are mostly parallel to the substrate except for fringe areas near the electrodes. This arrangement is known for use in displays where the liquid crystal needs to switch between two states, namely a ground state (e.g. twisted nematic or homeotropic) and a powered state in which the liquid crystal is aligned parallel to the substrates. In this case, the purpose is to achieve a uniform reorientation of the liquid crystal within the cell (between the electrodes 114A and 114B).

FIG. 13B illustrates a cell geometry in which the aspect ratio R is less than about 1. Such an aspect ratio can provide an intensity distribution as a function of viewing angle with side-lobe peaks that are not suitable for beam steering.

FIG. 13C illustrates a cell geometry in which the aspect ratio R is greater than about 1 and less than about 4. This geometry provides good beam steering performance.

In the embodiment of FIGS. 12 and 13C, the electric field has components that are "vertical" (called "out of plane"), namely perpendicular to the substrate at which the electrodes 114A and 114B are located, and "horizontal", namely extending between the electrodes.

When the liquid crystal is oriented in its ground state by an alignment layer 118 that extends in the direction between the electrodes 114A and 114B (perpendicular to the electrode strips), the steered beam intensity profile can be altered due to the asymmetric difference in the angle between the electric field and the desired spatial distribution of orientation of the liquid crystal in the cell. As illustrated in FIG. 13C, the left side orientation of liquid crystal 120a is aligned with the electric field, while the right side orientation of any liquid crystal (at 120b) in the filler 122 would be orthogonal to the electric field.

As will be appreciated from FIGS. 13A, 13B and 13C, the aspect ratio has an impact on the spatial profile of the liquid crystal orientation within the cell, and an appropriate beam shaping optical device can be provided with a suitable aspect ratio as illustrated in FIG. 13C, whereas FIGS. 13A and 13C provide beam shaping that is not uniform or not effective.

The strip electrodes 114A and 114B can be narrow enough so as to reduce the size of the boundary zone between adjacent cells. The aperture of a device having a cell illustrated in FIG. 13C can have many such cells, whether arranged in strips, rings, spirals or other geometric patterns, given the small gap of each cell of about 30 microns to about 90 microns, and typically around 50 microns, namely about 20 cells per linear millimeter of aperture.

The configuration of FIGS. 11 and 12 provides devices that provide no light modulation under conditions of zero power, and then provide beam control when powered.

Figure 14:
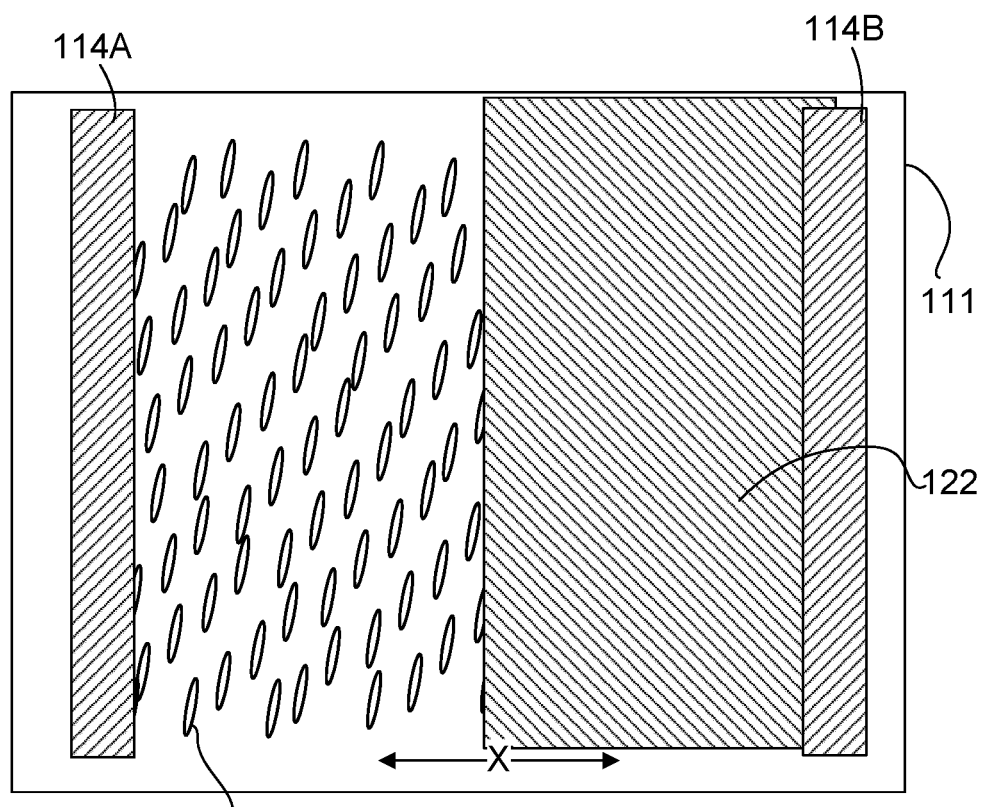
FIG. 14 is a schematic plan view of an element according to FIG. 13C in which liquid crystal alignment is parallel to the strip electrodes, in accordance with an embodiment of the proposed solution.

In FIG. 14, an alternate configuration is schematically shown in plan view in which the direction of the alignment layer is almost in the direction of the strip electrodes 114A and 114B. Here, the electric field component in the horizontal or X direction would act on the molecules to turn them sideways against the action of the alignment layer. However, the vertical or Z direction component of the electric field acts on the liquid crystal molecules with good symmetry across the gap. This configuration provides good phase delay profile for beam steering.

Figure 15A:
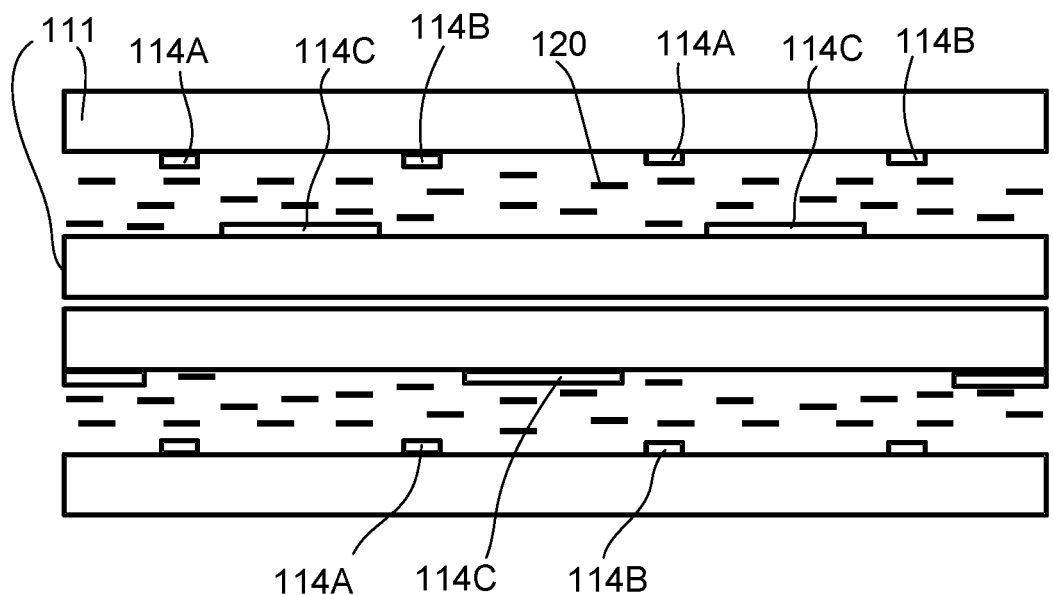
FIG. 15A is a schematic representation of a cross-section of a liquid crystal beam steering device having two liquid crystal cells, powered strip electrodes on one substrate and offset middle electrodes that are grounded, with odd elements of the upper cell having middle electrodes and even elements having no middle electrodes, and even elements of the lower cell having middle electrodes and odd elements having no middle electrodes, in accordance with an embodiment of the proposed solution.

In FIG. 15A, a different electric field arrangement is illustrated that can be used for beam shaping and beam steering. In this arrangement, two LC 120 cells are used to steer (manipulate) a light beam with extra ordinary polarization in the drawing plane from left to right or vice versa. All LC molecules are oriented in the same plane of the page, although the orientation of the liquid crystal with respect to the direction of the strip electrodes 114A and 114B can be chosen for example to be parallel with the direction of the electrodes as described above with respect to other embodiments.

For steering operation, the electrodes 114C are grounded (namely connected to ground or an opposite polarity of the drive signal source). There is a voltage provided on electrodes 114A, while the electrodes 114B are floating or disconnected. Thus, for steering in one direction, electrodes 114A and 114C can be connected to, for example, an alternating current voltage source, while electrodes 114B are disconnected. In this case, approximately half of light propagating in the vertical direction will be steered to the right thanks to the cells in the upper layer and the other half of light will be steered in the same direction thanks to the cells in the lower layer. Making the electrodes 114A floating and the electrodes 114B connected to a voltage would allow the steering to the left (for a liquid crystal with positive dielectric and optical anisotropies). The two middle substrates 111 between the two liquid crystal layers 120 can be provided as a single substrate 111.

Figure 16:
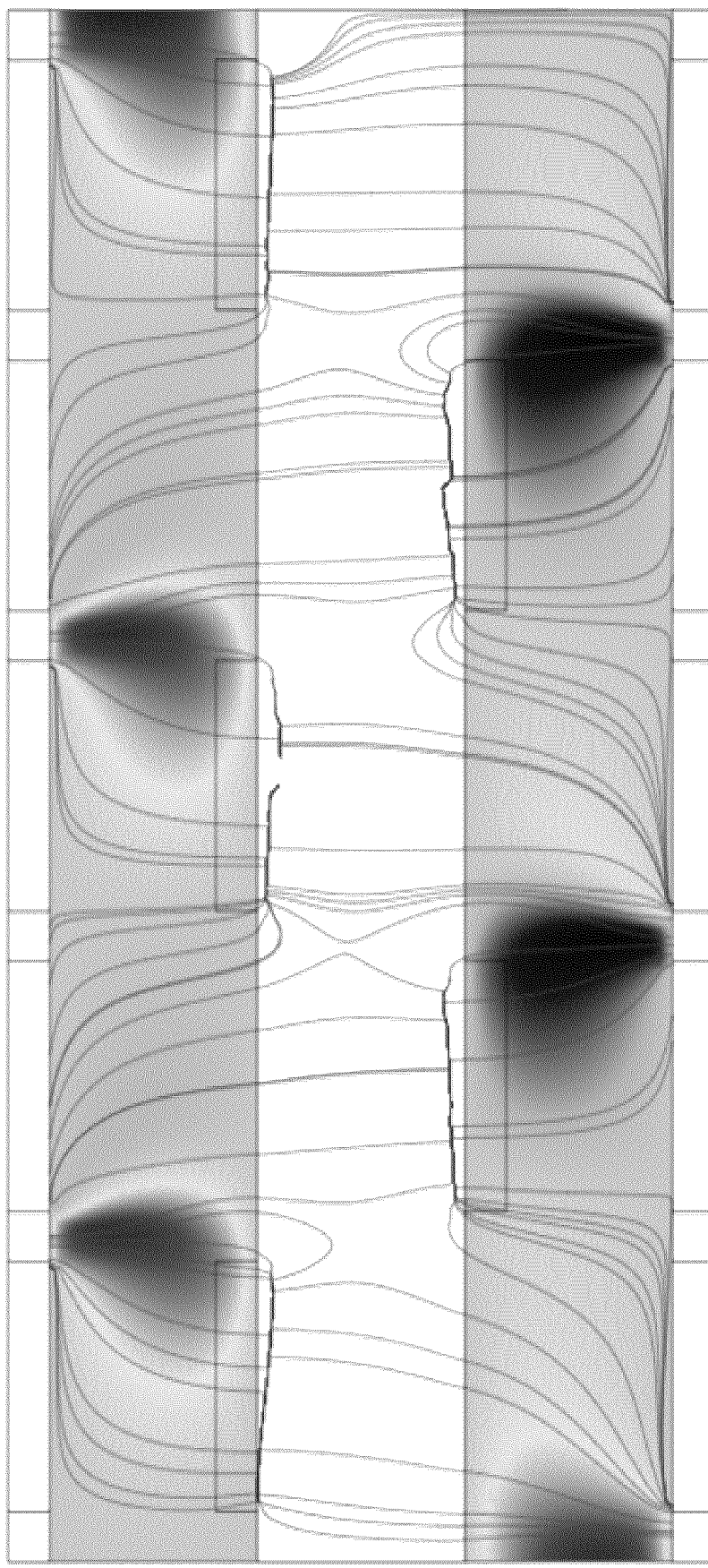
FIG. 16 is an illustration of electric field lines and liquid crystal reorientation derived from simulation for the embodiment of FIG. 15A, in accordance with an embodiment of the proposed solution.

The electric field between the electrodes 114A or 114B and the grounded electrode 114C are essentially "vertical", namely perpendicular to the lateral extent of the liquid crystal layer, even if the electrodes 114A and 114B are somewhat spaced to one side of electrodes 114C. This is illustrated in FIG. 16.

It will be appreciated that the electric field will extend between a powered electrode, for example 114B, and the nearest grounded middle electrode 114C, the grounded electrode 114C on the opposite side of the middle substrate 111 and the farther grounded electrode 114C on the same side of the middle substrate 111. The field strength can be high enough when extending to the closest middle electrode 114C to orient the liquid crystal 120, while the field strength extending to the farther electrodes 114C can be weak enough so as to cause negligible orientation of the liquid crystal 120. Accordingly, such field lines are suitable for orienting liquid crystal 120 having a ground state orientation (provided by alignment layers) that is close to the substrate planes 111, as illustrated. The electric field lines are strongest in the region below the powered electrodes 114A and/or 114B, and are much weaker in the direction away from the nearest electrode 114C, and likewise drop off gradually in strength in the direction towards the middle of the electrodes 114C. This provides for an electric field gradient that is suitable for a spatially variable orientation of the liquid crystal material 120 to provide the beam steering or beam shaping element.

Figure 17:
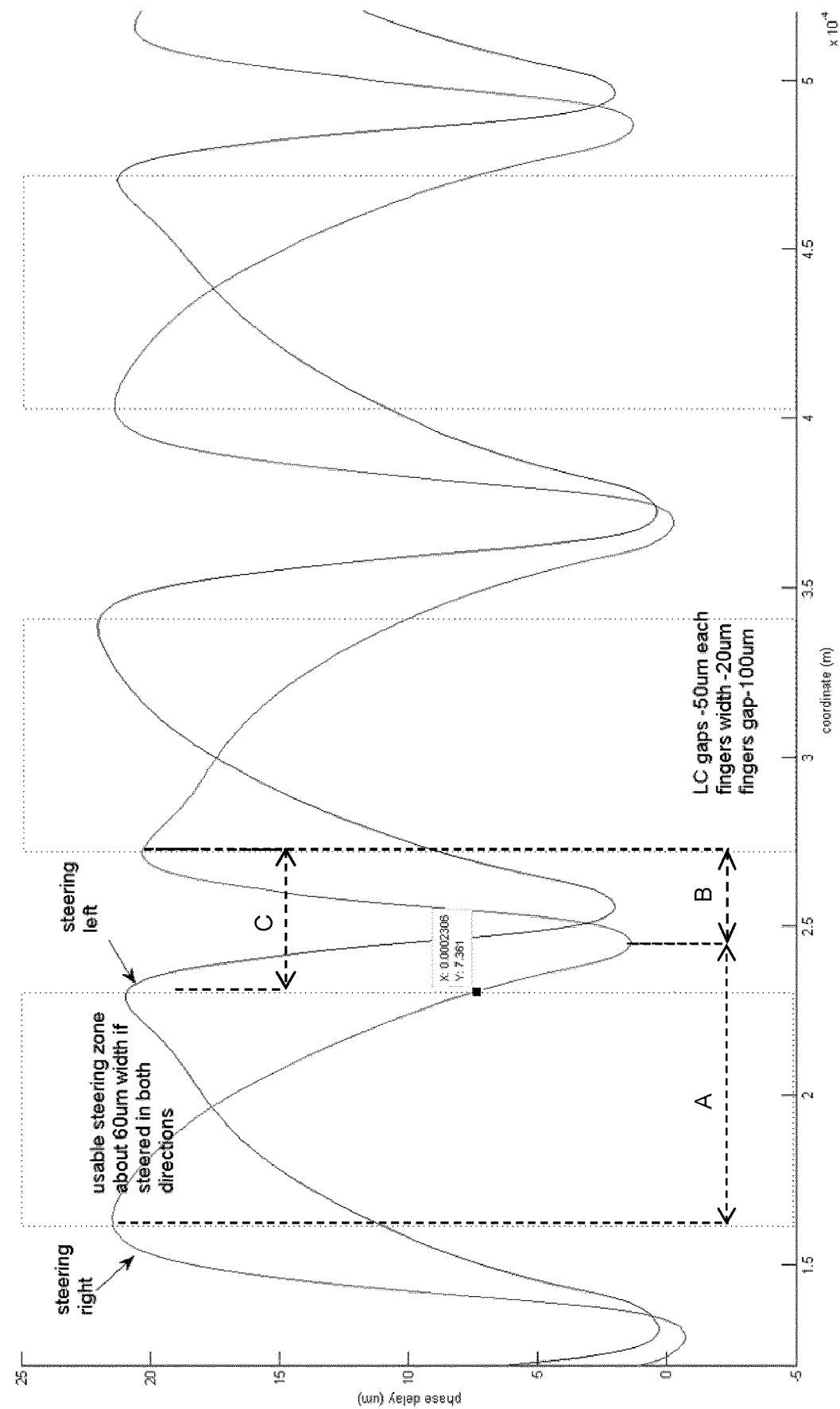
FIG. 17 is an illustration of simulation results for optical phase delay as a function of position across the device of FIG. 15A, in accordance with an embodiment of the proposed solution.

The arrangement of a strip electrode with an opposed offset middle electrode 114C provides a phase delay profile as illustrated in FIG. 17. The simulation in FIG. 17 was done for a thickness of liquid crystal of 50 microns, strip electrode 114 widths of 20 microns, a gap between the strip electrodes 114A and 114B of 100 microns. The offset, as shown in FIG. 16, does not need to be very much. Considered from the center of the beam steering element, the strip electrode 114A or 114B's outside edge extends about 20 microns from the corresponding outer edge of the offset middle electrode 114C. This is the width of the strip electrode 114A or 114B. The inside edges of the electrodes 114A or 114B may indeed overlap with the middle electrode 114C, or not (in FIG. 18A, the parameter 'd' can be positive, zero or slightly negative, as long as there is sufficient extension of the strip electrode 114B beyond the middle electrode 114C). The amount of this offset can vary as desired, the effect being to reduce the fringe electric field outside of the element 112.

Figure 15B:
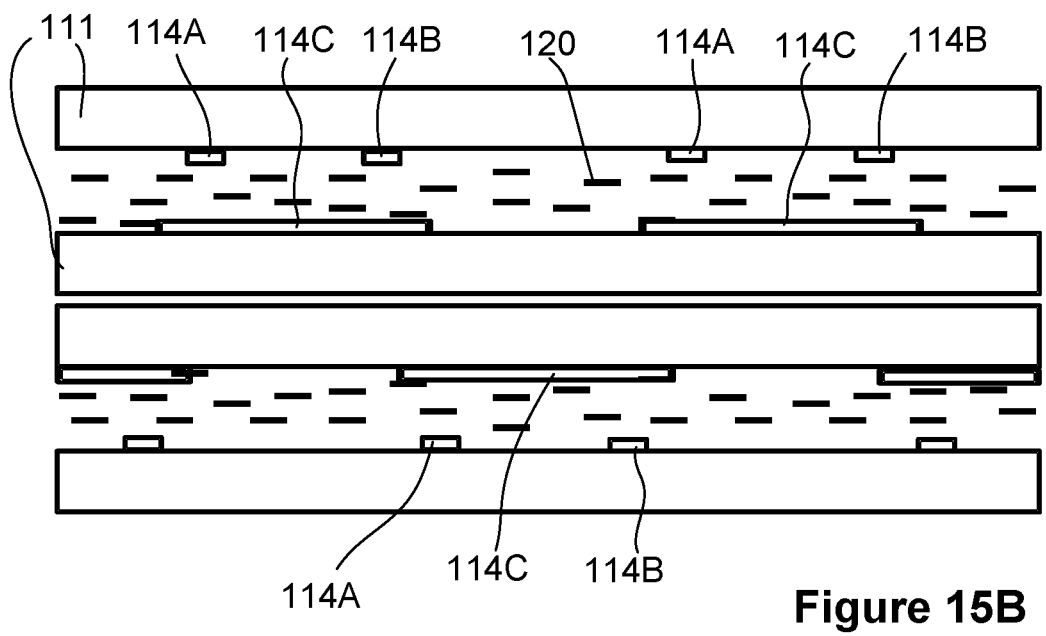
FIG. 15B shows a variant of FIG. 15A in which the offset is such that the middle electrode extends out and the strip electrodes are inset, in accordance with an embodiment of the proposed solution.

As illustrated in FIG. 15B, the offset can also be the result of the middle electrode 114C extending farther than the strip electrodes 114A and 114B. The result is the same, namely the fringing field is reduced, and the desired beam steering phase delay profile can be achieved.

The asymmetry between steering right and steering left might be explained by a liquid crystal planar orientation that was extending perpendicularly between the strip electrodes 114A and 114B, and thus the response to the electric field would be somewhat asymmetric with the elements.

What is striking about the simulation results of FIG. 17 is the very steep rise in the phase delay from minimum to maximum, as illustrated by the reference label B. This results from the reduction in the fringe field as described above due to the offset. As shown, this rise or return region represents only about 20% of the aperture. It should also be noted that this is achieved by using electrodes on the inside surfaces of the substrates, so that voltages are lower, and with a single control signal. The device also avoids the need for any weakly conductive layer.

The approximately 20% return region of the aperture will scatter or direct light in the opposite direction. In some applications, this effect is acceptable, and in others, it is not. When it is not acceptable, the portion of the beam steering elements where the return region is found can be masked. While this reduces the transmission efficiency of the device, it can remove the scattered or wrongly directed light. As illustrated in FIG. 17, if the combined return regions for both right and left steering were masked, there would be a 60 micron usable steering zone out of the electrode gap of 100 microns making up the steering elements. As mentioned above, if the liquid crystal alignment were as shown in FIG. 14, one might expect that the size of the combined return regions would be less due to greater symmetry between right and left steering modes.

FIG. 18A illustrates an embodiment similar to FIG. 15A in which odd and even elements have offset middle electrodes 114C and 114D. This device is driven by alternatingly applying a drive signal as shown in FIG. 18A and then as shown in FIG. 18B. Each configuration provides the electric field for forming beam steering elements in odd or even ones of the elements of the device. By time multiplexing the electrode drive configurations, the liquid crystal layer 120 can be provided with beam steering phase delay profiles in all elements.

Figure 19:
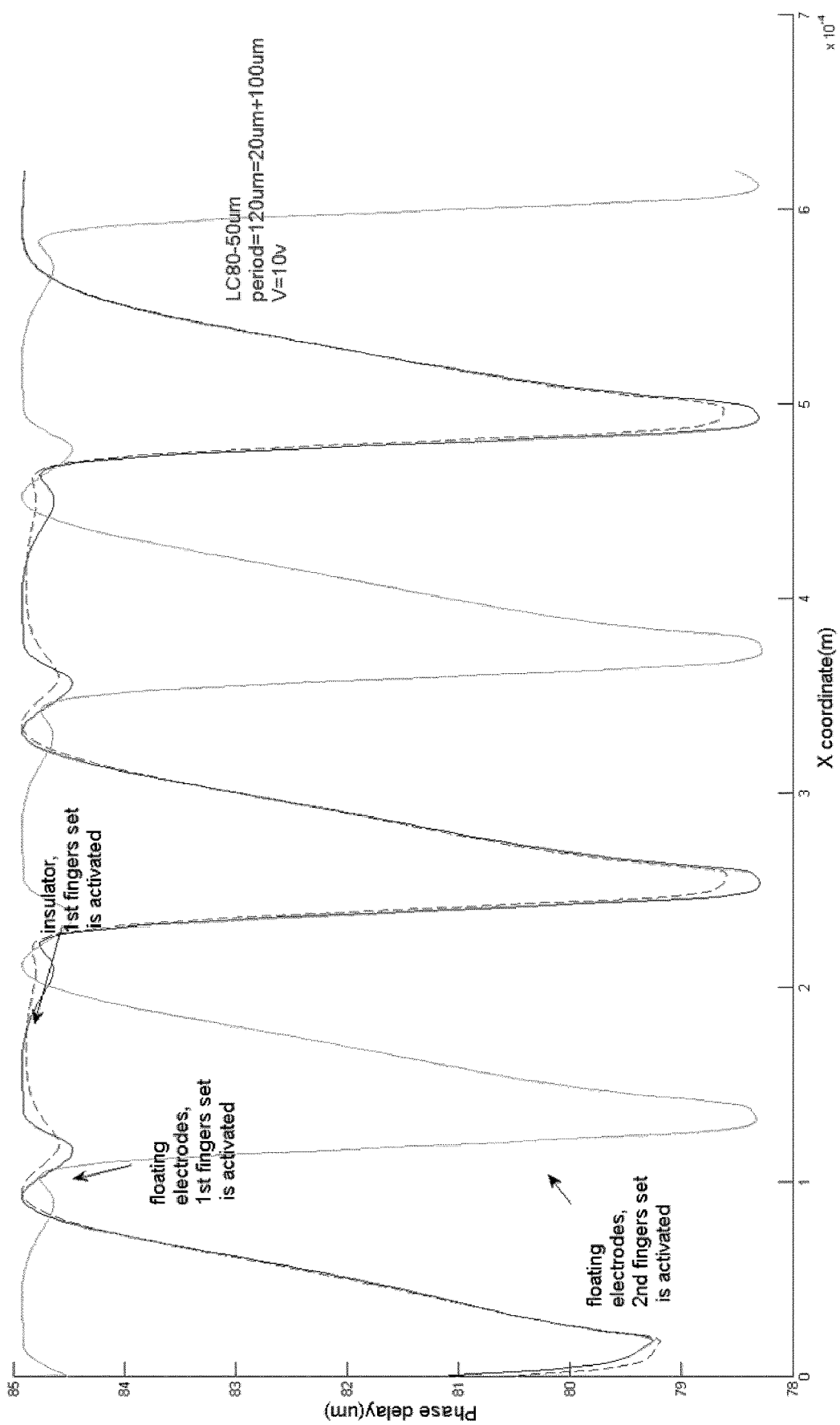
FIG. 19 illustrates simulation results for the configurations of FIGS. 18A and 18B, in accordance with an embodiment of the proposed solution.

Using drive circuitry that comprises electronic switches, a drive signal is first applied across electrodes 114A and 114C (with 114B and 114D being disconnected) for steering in one direction, while applying a drive signal across electrodes 114B and 114C for steering in the other direction (with 114A and 114D being disconnected). In FIG. 19, the phase delay of this first "fingers set activated" is shown. The beam steering ramp is about 80 microns and the return region is about 20 microns. Secondly, the drive signal is applied across electrodes 114B and 114D (with 114A and 114C being disconnected) for steering in one direction, while applying a drive signal across electrodes 114A and 114D for steering in the other direction (with 114B and 114C being disconnected). In FIG. 19, the phase delay of this second "fingers set activated" is shown (drive voltage is 10V, the liquid crystal material is LC80 and is 50 microns thick with electrode period of 120 microns, the electrodes 114A and 114B being 20 microns wide). The beam steering ramp and the return region characteristics are essentially the same for the two configurations, and there is a small ripple of modulation shown caused by each configuration on the unmodulated elements between the currently powered or modulated elements. The drive circuitry switches between the first and second configurations back and forth to achieve the maintenance of the beam steering phase delay profiles for all elements of the device.

In the embodiment of FIG. 18A, it is preferred to use middle electrodes 114C that are inset from the opposed strip electrodes as illustrated, since each strip electrode can be used for both left and right beam steering control. However, following the configuration of FIG. 15B can be done in the context of FIG. 18A, however the offset then requires that separate inset strip electrodes be used for left and right beam steering, with the electrodes 114C and 114D being separated only by a very small insulating gap. Thus, electrodes 114A and 114B would be provided as electrodes 114A-right, 114A-left, 114B-right and 114B-left.

The device of FIG. 15A or 18A manipulates one linear polarization of light in one plane, and can be considered to be a "quarter unit". Two such elements with orthogonal electrode lines, but having the LC molecules in the same plane can be used to manipulate the same polarization, but in two planes to form a "half unit". Furthermore, two "half-units" (overall 8 LC cells) can be provided to manipulate unpolarized light in two planes. A beam steering device that operates in two planes can move a beam in two orthogonal directions.

A beam controller is provided to generate control signals. For example, the light source, such as the LED die, can be controlled in intensity and/or in color using the beam controller. Also, the dynamic liquid crystal control element can be controlled using the beam controller, namely the electrodes 114A and 114B (or any of the electrode arrangements described above) can be controlled using the beam controller circuit. The beam controller can comprise dedicated circuitry or it can comprise configurable circuitry (e.g. FPGA), or it can be implemented using program code running on a suitable platform, for example a CPU or DSP based system.

The beam controller can be configured to receive control commands over a data network to adjust the beam direction. Some light sources, for example infrared light sources, can be used to provide data communication, and in this case the beam controller can be used to modulate the light source with data, while the dynamic LC control element can be used to steer the data-carrying beam. This can be useful for scanners, receivers and readers in addition to light projectors or sources.

Figure 20:
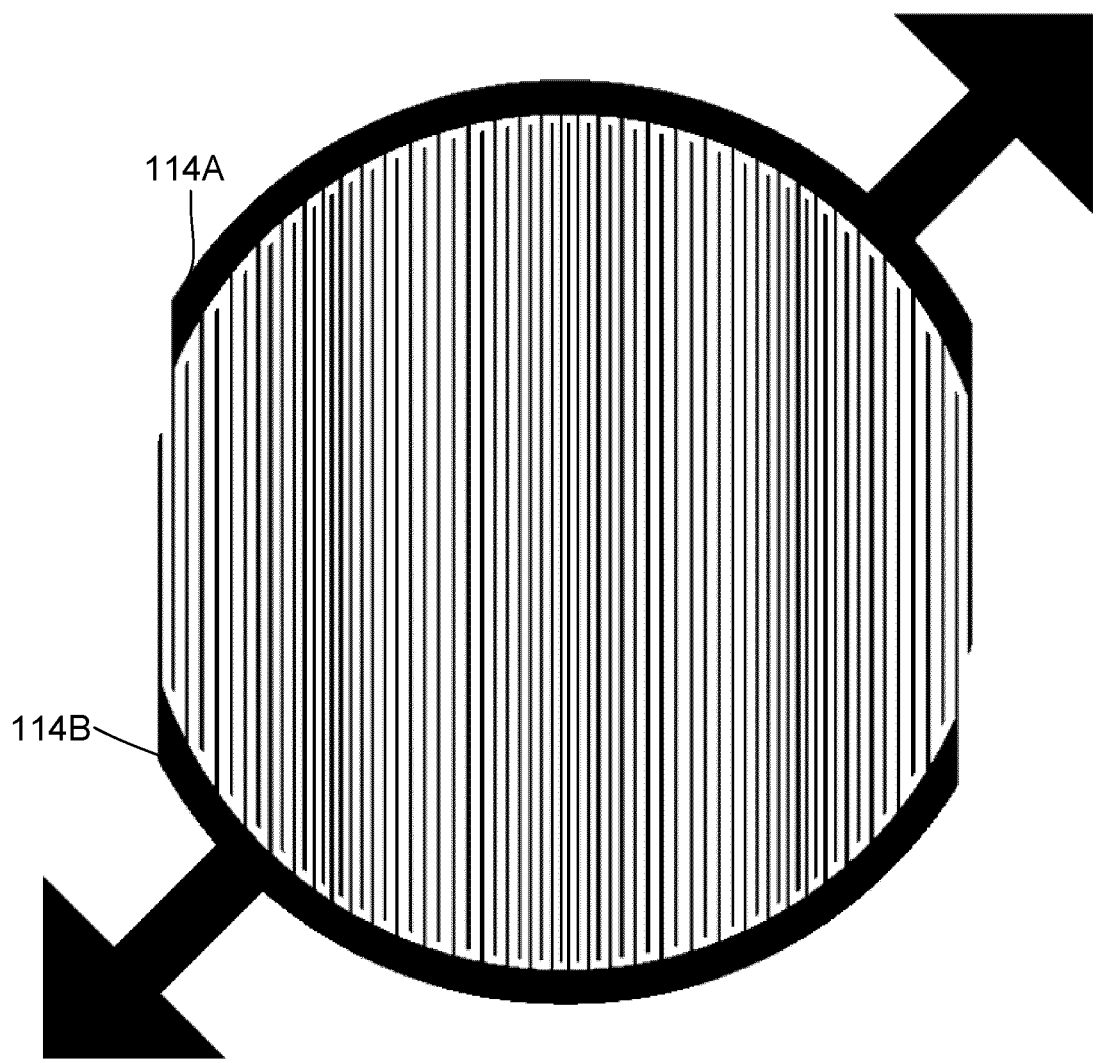
FIG. 20 is a schematic plan view of an array of strip electrodes having a spatially variable gap or spacing between the strip electrodes, in accordance with an embodiment of the proposed solution.

In the embodiment of FIG. 20, there is shown an electrode array having strip electrodes 114A and 114B. The electrode spacing is 50 microns in the middle of the 6 mm aperture of the device and 100 microns at the outer sides. In the example illustrated, the gap increases/decreases by 5 microns from one gap to the next. Small gaps have a higher beam shaping or beam steering ability or power, and larger gaps have smaller power.

Such variation of strip electrode gap may be linear or non-linear. An effect of the variation or chirp can be to eliminate or reduce any color separation and hot spot formation in the transmitted light. This is because different portions of the optical element will redirect the same wavelength (i.e. color) of light in different directions.

For example, a beam can have symmetry with respect to an optical axis. In such as case, the electrodes can be provided as concentric rings 114A and 114B (essentially forming a Fresnel lens). The spacing of the rings can be closer near the central optical axis, and farther apart near the outermost ring to provide a beam spread that is more even. The spacing can also take into consideration a beam intensity profile to provide more elements where the intensity is greater. This type of electrode (concentric rings) may be used along with a star-shaped inter-digitated electrode structure on the opposed substrate of the cell.

It will be appreciated that strip electrode patterns as described herein can be applied to a variety of liquid crystal cell designs. In the case of concentric rings, beam shaping or beam steering is done in the one radial direction with respect to the optical axis, and thus a typical design might have two layers of liquid crystal, one for each polarization. The spatial chirp may also be applied in circular or star shaped electrode cases.

Figure 21:
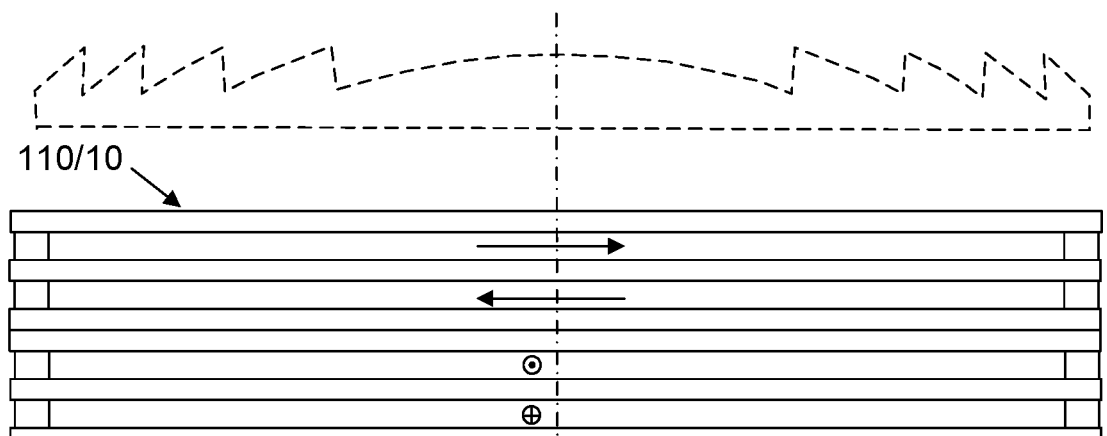
FIG. 21 is a schematic cross-sectional diagram illustrating in alignment by the optical axis:
- at the top, a cross-section a conventional refractive Fresnel lens;
- in the middle, a cross-section of an optical device geometry, optically corresponding to the conventional refractive Fresnel lens, including four stacked LC layers to reduce sensitivity or image aberrations of the device to incident light that is not parallel to the optical axis of the overall device as the light passes through the overall device; and
- at the bottom, a schematic diagram illustrating a plan view of the LC lens shown in the middle having a circular geometry including a central circular micro element and four concentric band micro elements, in accordance with the proposed solution.

A liquid crystal device 10/110 such as in the above embodiments comprises LC layers having alignment layers aligned in one direction. As briefly mentioned hereinabove, such a device 10/110 acts on a single linear polarization of light and unpolarized light passing through the device is processed by the optical device as two linear polarization states. The spatial modulation of the index of refraction in the LC material provided with respect to the extraordinary polarized light, while the other ordinary polarized light does not experience a spatial modulation of the index of refraction. In order to control unpolarized light, a second optical device 10/110 is typically provided with alignment layers oriented orthogonally to those of the first optical device to act on the other polarization. This is schematically illustrated in the FIG. 21, that is electrodes 114 and 115 are provided in respect of an additional LC cell in a manner similar to the first LC cell. It is also known from international patent application publication WO2009/146530 published 10 Dec. 2009 to arrange four LC cells together, with alignment layers of two LC cells acting on the same light polarization having alignment layers oriented in opposite directions as illustrated in FIG. 21. Such an arrangement of four LC cells reduces the sensitivity or image aberrations of the device 10/110 to incident light that is not parallel to the optical axis of the overall device as the light passes through the overall device.

Figure 22:
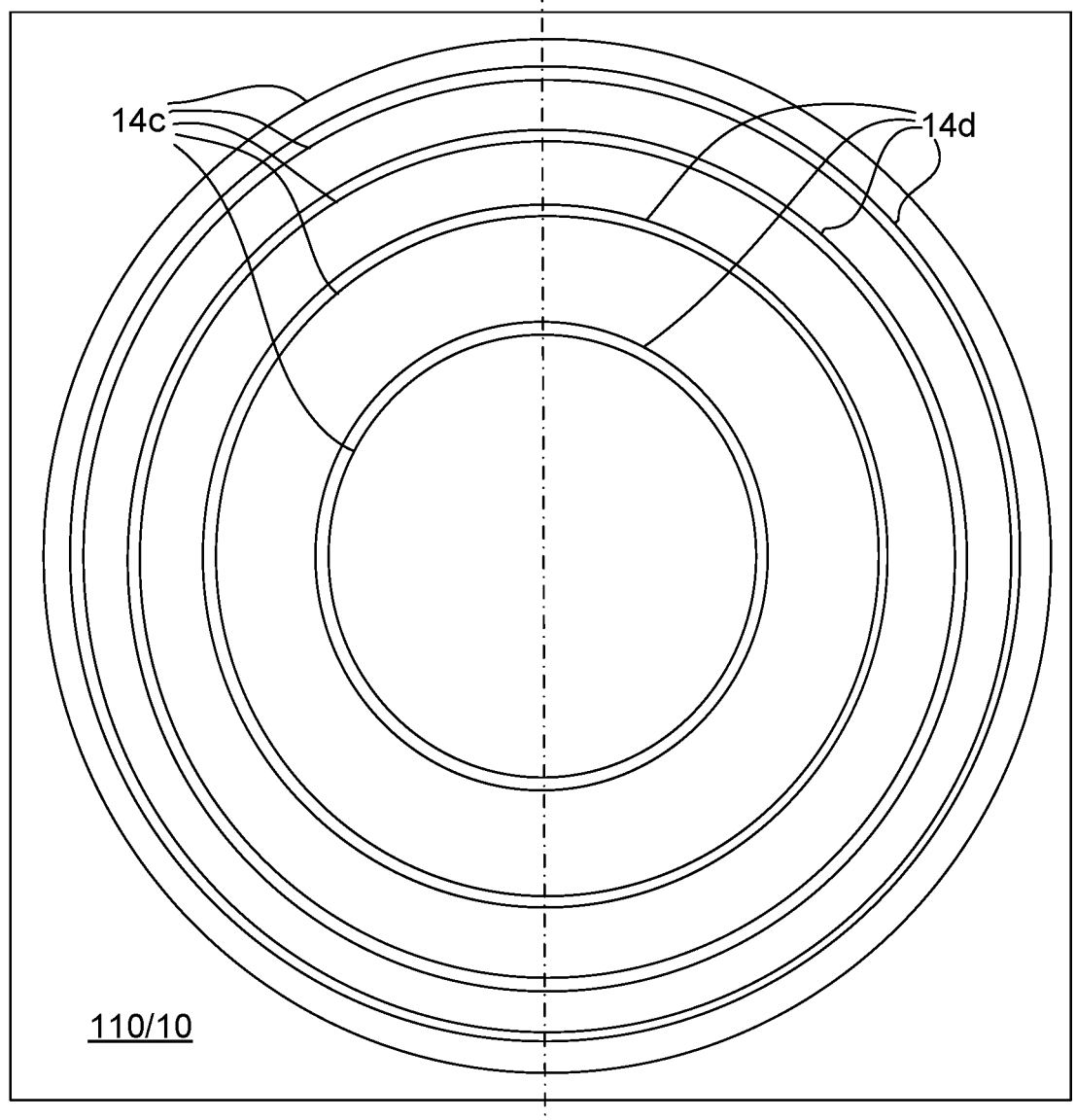
FIG. 22 is a schematic plan view of the device illustrated in FIG. 21, in accordance with the proposed solution, wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.

While FIGS. 5 through 20 illustrate a beam steering device, the arrangement used to cause liquid crystal to change orientation across the zone boundary with a reduced non-linear zone can also be used for a variety of Fresnel lens designs, for example as illustrated in FIG. 22. In such cases, the electrode geometry will be different and will not form only rectangular zones, but rather typically arcuate or circular zones, as is known in the design of Fresnel lenses. In the lens shown in FIG. 22, the conventional refractive counterpart lens is illustrated at the top of the page in dashed lines in cross-section aligned with a four layer liquid crystal gradient index lens having a similar behavior. The central zone is created by the central ring electrode 14c providing in combination with the weak conductive material 16 (not shown in FIG. 21) an axially symmetric voltage distribution in the central area that tends to zero near the optical axis. In this illustration, the bands are maintained as the same size as the conventional Fresnel lens, however it will be understood that the dimensions of each micro element using such liquid crystal devices will be typically much smaller and more numerous than would be used when making a Fresnel lens from a thicker optical refractive material. The electrodes 14c and 14d are shown with greater separation than would normally be implemented for ease of illustration. The electrical connections between the electrodes 14c and 14d and the driver signal sources are also not illustrated for ease of illustration. The four layers of liquid crystal material (FIG. 21) have orientations as illustrated to provide for good optical performance on natural light (both polarizations) and with reduced sensitivity to light that is not parallel to the optical axis. Such a lens 10 can be fully effective with only two layers to work with natural light if the rays stay close to being parallel to the optical axis. Additional layers can also be used to increase the thickness of the lens material and thus the optical power.

The device illustrated schematically in FIG. 6 and as described above using different electric field control structures described with reference to FIGS. 7 to 22 above, or a different Fresnel lens design can be applied to a variety of applications including redirection of light emitted by LED light sources for illumination purposes. Liquid crystal materials can also be used for steering or focussing infrared light, for example 850 nm, and a device as described above can be used to scan in the infrared spectrum.

It will also be appreciated that optical devices can be made according to above embodiments that are operative into the terahertz frequency, namely within the wavelength range of 8000 to 14000 nm of human body radiation. Thus tunable control over Fresnel refractive lenses and/or the ability to control beam steering of a projected beam of infrared light for detectors sensitive to this range of wavelengths can find useful application, for example, in the optics of infrared motion detectors.

While the invention has been shown and described with reference to preferred embodiments thereof, it will be recognized by those skilled in the art that various changes in form and detail may be made therein without departing from the spirit and scope of the invention as defined by the appended claims.

What is claimed is:

1. A liquid crystal optical device providing beam steering multiple refractive or refractive Fresnel lens type element control over light passing through an aperture, the device comprising:
   a first pair of layers of liquid crystal material contained by substrates having alignment layers; and
   an arrangement of electrodes configured to provide a spatially varying voltage distribution within a number of micro element zones within said liquid crystal layer, said micro element zones being separated by optically inert zones unaffected by a variable electric field, wherein the micro element zones on one liquid crystal layer correspond to optically inert zones of the other liquid crystal layer, and wherein said first pair of layers combine to provide a desired optical control and the optically inert zones allowing for an abrupt change in phase delay between liquid crystal and optically inert zones; and
   wherein the liquid crystal optical device is structured to provide a spatial variation in the optical phase delay with an abrupt transition at a boundary between micro element zones that is an approximation of a sawtooth waveform across the boundaries of multiple micro element zones to increases the effective aperture of the optical device.

2. The liquid crystal optical device as defined in claim 1, further comprising a driver circuit configured to provide drive signals to said arrangement of electrodes.

3. The liquid crystal optical device as defined in claim 2, wherein the liquid crystal layer comprises dual frequency liquid crystal material, the arrangement of electrodes comprises first and second electrodes near a boundary between adjacent ones of said micro element zones, and a drive signal for said first electrode is of a low frequency for causing alignment of the dual frequency liquid crystal material parallel to the electric field, and a drive signal for said second electrode is of a high frequency for causing alignment of the dual frequency liquid crystal material perpendicular to the electric field.

4. The device as defined in claim 1, wherein said arrangement of electrodes further comprise floating electrodes that help to shape the electric field within the micro element zones.

5. The device as defined in claim 1, wherein the arrangement of electrodes comprises hole-patterned electrodes.

6. The device as defined in claim 5, wherein the arrangement of electrodes further comprises a weakly conductive material for distributing voltage from the electrodes over an aperture of the micro element zones.

7. The device as defined in claim 1, wherein arrangement of electrodes has a linear pattern.

8. The device as defined in claim 1, wherein arrangement of electrodes has a spiral or circular pattern.

9. The device as defined in claim 1, wherein said micro element zones have a variation in width over an aperture of the device.

10. The device as defined in claim 1, further comprising a drive signal controller for generating at least one drive signal for said arrangement of electrodes, wherein said drive signal controller is configured to selectively connect some of said electrodes to a drive signal and disconnect others of said electrodes to be floating, wherein said drive signal controller is configured to drive said device selectively in a beam broadening mode or in a beam steering mode.

11. The device as defined in claim 1, wherein said beam steering device is configured to steer light in two orthogonal planes.

12. The device as defined in claim 1, wherein the device is a Fresnel lens, and the arrangement of electrodes comprises strip electrodes defining boundaries between Fresnel micro element zones.

13. The device as defined in claim 1, including a second pair of layers of liquid crystal material arranged with liquid crystal orientations orthogonally and in opposed directions among the layers of the first and second pairs of layers of liquid crystal material.

* * * * *